United States Patent
Reed, Jr. et al.

(10) Patent No.: US 6,463,821 B1
(45) Date of Patent: Oct. 15, 2002

(54) METHOD OF CONTROLLING A TRANSMISSION HAVING A DUAL CLUTCH SYSTEM

(75) Inventors: Richard G. Reed, Jr., Royal Oak, MI (US); Jeffrey P Cherry, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/896,767

(22) Filed: Jun. 29, 2001

(51) Int. Cl.[7] ................................................. F16H 3/08
(52) U.S. Cl. ...................... 74/330; 74/331; 74/336 R; 477/174; 477/175; 477/176; 192/103 R; 192/103 C
(58) Field of Search ................................ 477/79, 80, 86, 477/97, 174, 175, 176, 180; 74/330, 331, 329, 336 R, 335, 340; 192/48.1, 48.2, 48.7, 48.8–48.91, 103 R, 103 C

(56) References Cited

U.S. PATENT DOCUMENTS

| | | | | |
|---|---|---|---|---|
| 2,658,405 A | * | 11/1953 | Dodge ........................... 74/330 |
| 3,774,460 A | | 11/1973 | Browning et al. .......... 74/15.84 |
| 4,376,473 A | | 3/1983 | Tomasek et al. ............ 192/3.58 |
| 4,412,461 A | | 11/1983 | Windsor ....................... 74/866 |
| 4,513,631 A | * | 4/1985 | Koivunen ..................... 74/331 |
| 4,519,484 A | | 5/1985 | Nagaoka et al. ........... 192/3.58 |
| 4,527,678 A | | 7/1985 | Pierce et al. ............... 192/3.58 |
| 4,611,698 A | | 9/1986 | Lehmann ................. 192/30 W |
| 4,658,663 A | * | 4/1987 | Hiraiwa ....................... 74/330 |
| 4,790,418 A | | 12/1988 | Brown et al. ............. 192/0.032 |
| 4,860,607 A | * | 8/1989 | Numazawa et al. ....... 192/3.58 |
| 5,125,282 A | * | 6/1992 | Bender et al. ............... 74/333 |
| 5,603,242 A | * | 2/1997 | Krieger ....................... 74/335 |
| 5,711,409 A | * | 1/1998 | Murata .................... 192/87.11 |
| 5,720,203 A | * | 2/1998 | Honda et al. ................ 74/325 |
| 5,823,051 A | * | 10/1998 | Hall, III ..................... 475/207 |
| 5,890,392 A | * | 4/1999 | Ludanek et al. ............. 74/331 |
| 5,915,512 A | | 6/1999 | Adamis et al. ............ 192/3.61 |
| 5,950,781 A | | 9/1999 | Adamis et al. ............ 192/3.61 |
| 5,964,675 A | * | 10/1999 | Shimada et al. ........... 475/123 |
| 5,966,989 A | * | 10/1999 | Reed et al. ................... 74/331 |
| 5,997,433 A | * | 12/1999 | Domian et al. ............ 192/3.58 |
| 6,012,561 A | | 1/2000 | Reed, Jr. et al. ........... 192/48.2 |
| 6,044,719 A | | 4/2000 | Reed, Jr. et al. ............. 74/330 |
| 6,055,879 A | * | 5/2000 | Abe et al. ................ 192/87.15 |
| 6,209,406 B1 | * | 4/2001 | Sperber et al. ............... 74/330 |
| 6,210,298 B1 | * | 4/2001 | Baur et al. .................. 475/211 |
| 6,397,692 B1 | * | 5/2002 | Carriere ....................... 74/331 |

FOREIGN PATENT DOCUMENTS

| | | | | |
|---|---|---|---|---|
| JP | 60078118 A | * | 5/1985 |
| JP | 02146336 A | * | 6/1990 |
| JP | 11037260 A | * | 2/1999 |
| JP | 11082729 A | * | 3/1999 |

* cited by examiner

Primary Examiner—Charles A. Marmor
Assistant Examiner—David D. Le
(74) Attorney, Agent, or Firm—Mark P. Calcaterra

(57) ABSTRACT

A method of controlling a dual clutch transmission of a motor vehicle, wherein the first clutch acts to transmit torque to the first driven gear, and the second clutch acts to transmit torque to the second driven gear. The steps involved in controlling the transmission include determining a predetermined first clutch slip value based on the perceived vehicle loading, initiating launch of the motor vehicle with both the first and the second clutch partially engaged, determining the vehicle inertia value based on the summation of instantaneous vehicle inertia values during vehicle launch, and controlling either the first or the second clutch to disengage when the predetermined first clutch slip value is reached.

24 Claims, 18 Drawing Sheets

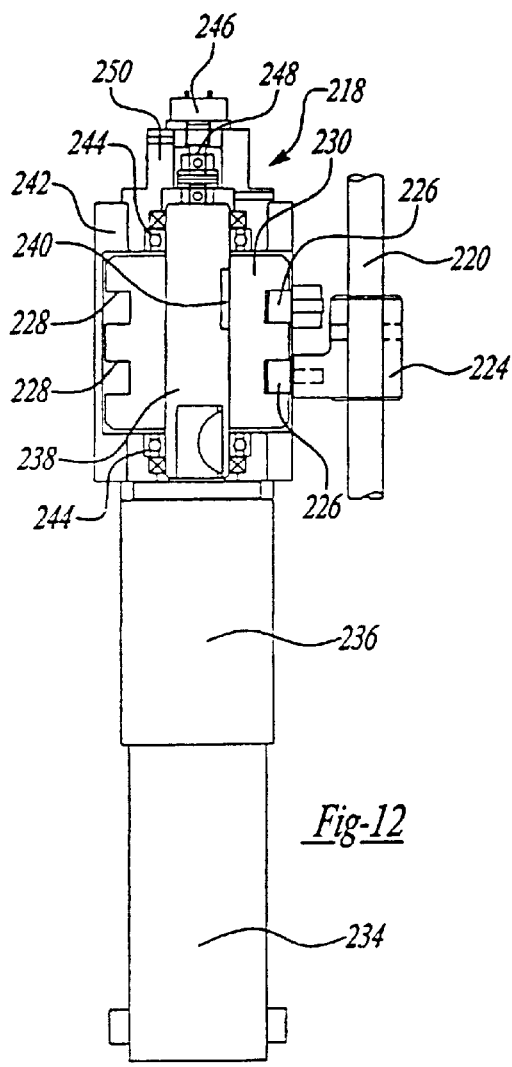
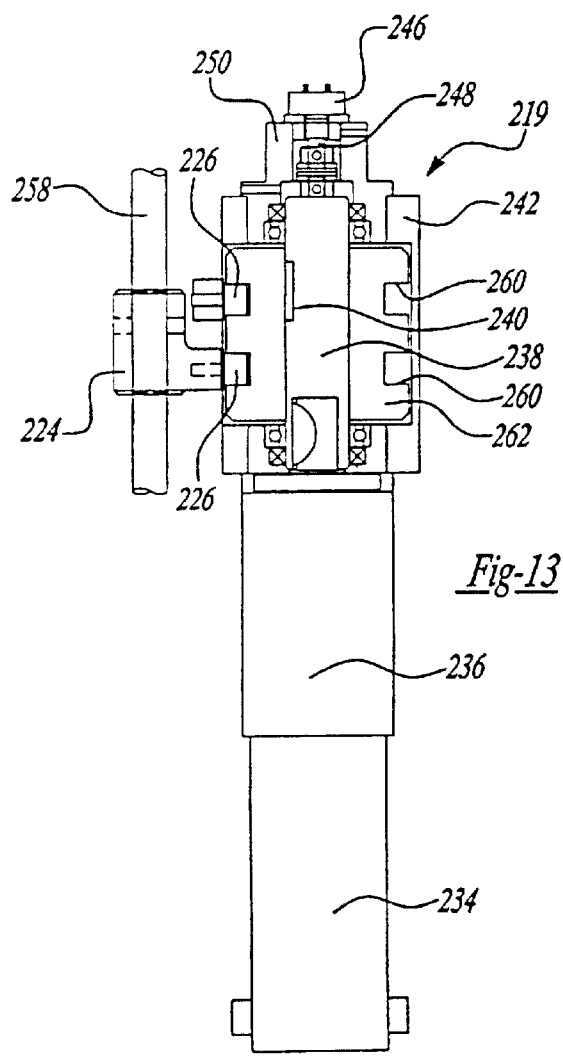

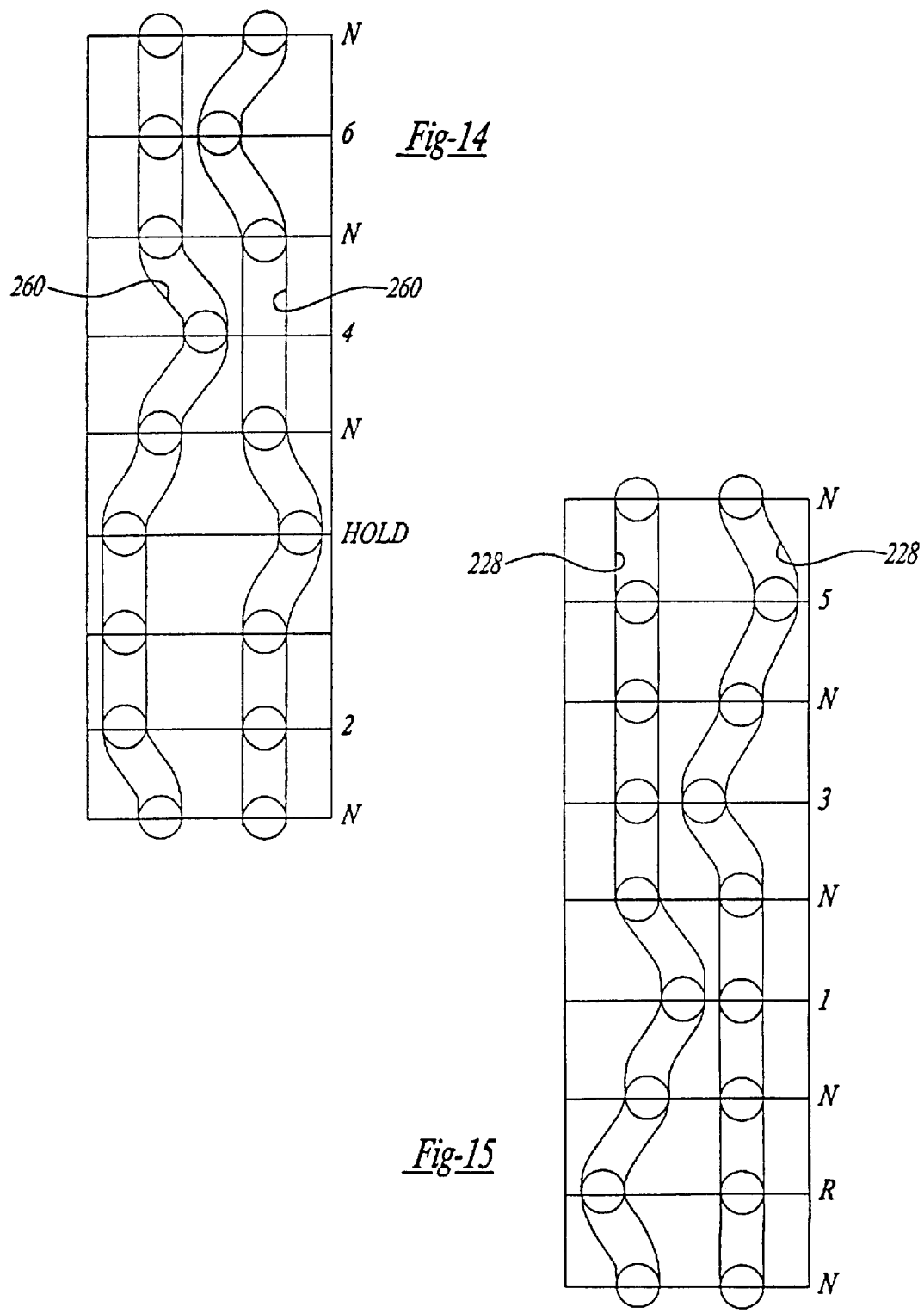

METHOD OF CONTROLLING A TRANSMISSION HAVING A DUAL CLUTCH SYSTEM

FIELD OF THE INVENTION

The present invention generally pertains to motor vehicles. More particular, the present invention pertains to a method of controlling a transmission. More specifically, but without restriction to the particular embodiment and/or use which is shown and described for purposes of illustration, the present invention relates to a method for controlling a transmission having a dual clutch system during vehicle launch.

BACKGROUND OF THE INVENTION

There are presently two typical power transmissions in use on the conventional automobile. The first, and oldest, type of powertrain is the manually operated powertrain. These powertrains are characterized by having manual transmissions including a clutch pedal to the left of a brake pedal and a gear shift lever which is usually mounted at the center of the vehicle just behind the dashboard. To operate the manual transmission, the driver must coordinate depression of the clutch and accelerator pedals with the position of the shift lever in order to select the desired gear. Proper operation of a manual transmission is well known to those skilled in the art, and will not be described further herein.

In a vehicle having an automatic transmission, no clutch pedal is necessary. The standard H configuration of the shift lever is replaced by a shift lever which typically moves back and forth. The driver need only select between park, reverse, neutral, drive, and one or two low gears. As is commonly known in the art, the shift lever is placed in one of several positions having the designator P, R, N, D, 2, and maybe 1 which correspond to Park, Reverse, Neutral, Drive, and one or two low gears, respectively. Vehicle operation when the gear shift lever is placed in one of these positions is well known in the art. In particular, when in the drive mode, the transmission automatically selects between the available forward gears. As is well known, older systems typically included first, second and third gears, while newer systems include first through third gears as well as a fourth and possibly a fifth and a sixth overdrive gears. The overdrive gears provide an improved fuel economy at higher speeds. As is well known, early transmissions were almost exclusively manually operated transmissions.

With a steady development of automatic transmissions, drivers increasingly gravitated toward the easy operation of automatic transmissions. However, in the mid 1970s, rising concerns about present and future fossil fuel shortages resulted in an implementation of corporation average fuel economy (CAFÉ) regulations propagated in several countries. These fuel economy requirements necessitated the investigation of increasing the fuel economy of motor vehicles in order to meet government regulations. These government regulations prompted a gradual return to manual transmissions which are typically more efficient than automatic transmissions.

In the ensuring years, many mechanically operated vehicle systems were replaced or at least controlled by electronic control systems. These electronic control systems greatly increased the fuel efficiency of vehicle engines and enabled a gradual return to the convenience of automatic transmissions. In addition, electronic controls used with automatic transmissions, greatly improved the shift schedule and shift feel of automatic transmissions and also enabled implementation of fourth and fifth overdrive gears thereby increasing fuel economy. Thus, automatic transmissions have once again become increasingly popular.

Automatic and manual transmissions offer various competing advantages and disadvantages. As mentioned previously, a primary advantage of a manual transmission is improved fuel economy. Conversely, automatic transmissions first and foremost offer easy operation, so that the driver need not burden both hands, one for the steering wheel and one for the gear shifter, and both feet, one for the clutch and one for the accelerator and brake pedal, while driving. When operating an automatic transmission, the driver may have both one hand and one foot free. In addition, an automatic transmission provides extreme convenience in stop and go situations, as the driver need not worry about continuously shifting gears to adjust to the ever-changing speed of traffic.

The primary reason for the superior efficiency of the manual transmission over the automatic transmission lies in the basic operation of the automatic transmission. In most automatic transmissions, the output of the engine connects to the input of the transmission through a torque converter. Most torque converters have an input impeller that is connected to the output shaft of the engine and an input turbine that is connected to the input shaft of the transmission. Movement of the impeller at the input side results in a hydraulic fluid flow which causes a corresponding movement of the hydraulic turbine connected to the input shaft of the transmission. While torque converters provide a smooth coupling between the engine and the transmission, the slippage of the torque converter results in a parasitic loss, thereby decreasing the efficiency of the powertrain. Further, the shift operation in an automatic transmission requires a hydraulic pump which pressurizes a fluid for clutch engagement. The power required to pressurize the fluid introduces additional parasitic losses of efficiency in the powertrain.

Before a shift between the gear ratios of a manual transmission can occur, it is necessary to synchronize the rotational speed of the driveshaft with the rotational speed of the driven shaft. Typically, synchronization is obtained in a manual transmission by way of a synchronizing mechanism such as a mechanical synchronizer which is well known in the art. The mechanical synchronizer varies the speed of the driveshaft to match the speed of the driven shaft to enable smooth engagement of the selected gear set. For example, during an upshift, the mechanical synchronizer utilizes frictional forces to decrease the rate of rotation of the driveshaft so that the desired gear of the driveshaft is engaged smoothly to drive the desired gear of the driven shaft. Conversely, during a downshift, the mechanical synchronizer increases the rate of rotation of the driveshaft so that the desired gear is engaged smoothly to drive the desired gear on the driven shaft.

Typically, with a manual transmission, there is a delay period between disengagement of the currently engaged gear and the subsequent synchronization and engagement of the desired transmission gear. Also, during this process, the clutch connection between the engine output shaft and the transmission input shaft needs to be disengaged prior to the gear shifting process and reengaged upon synchronization. These delays and periods of clutch disengagement create periods of torque interruption that are generally undesirable and usually result in a noticeable jolt as the gears are shifted. Such a jolt is particularly noticeable in the shift between first and second gears as the vehicle accelerates.

In order to reduce these jolts and to still take advantage of the benefits of manual transmissions, as well as to provide an automated shifting system, various designs have been proposed. In particular, various dual clutch manual transmissions have been proposed that include automated electromechanical shifting mechanisms and methods. For example, U.S. Pat. Nos. 6,044,719 and 6,012,561, which are incorporated herein by reference, each disclose a dual clutch electo-mechanical automatic transmission.

In general, these dual clutch type systems attempt to reduce the jolt associated with torque interruption as gears are shifted by starting to engage the next gear with one clutch while the current gear is disengaged with the other clutch. To further reduce the jolt associated with gear shifts in these types of transmissions, methods to control dual clutch transmissions have also been proposed.

For example, U.S. Pat. Nos. 5,950,781 and 5,915,512 each disclose a twin-clutch transmission having two input shafts and a method for controlling the transmission. The first input shaft is attached to the primary drive gears, and the second input shaft is attached to one or more auxiliary gears. The method disclosed is for controlling a gear shift between primary gears on the first input shaft wherein an auxiliary gear on the second input shaft provides a filler torque during the change in primary gears. This method is designed to reduce the jolt associated with the primary gear changes by use of the filler torque.

Although the use of a filler gear may reduce the jolt involved with shifting from the first primary gear to the second primary gear, the filler torque method still involves changing from $1^{st}$ to $2^{nd}$ gear, which will include at least somewhat of a jolt due to the typically large difference in these gear ratios. Additionally, this method places a large amount of stress on the clutch associated with the first drive gear, which typically must transmit a large amount of torque to initially start the vehicle moving from a dead stop. As a result, a large amount of heat is typically generated in this clutch during vehicle launch. This clutch is even further stressed during vehicle launch when the vehicle hauls a large load.

Alternatively, U.S. Pat. Nos. 4,790,418; 4,611,698; 4,527,678; 4,519,484; 4,412,461; and 4,376,473 each disclose a method for controlling a multi-clutch transmission. Particularly, each of them disclose a method for controlling the transmission during a gear shift, and each of them teach that the clutch associated with an engaged drive gear is disengaged while the clutch associated with the next gear to be engaged is substantially and concurrently engaged. Although these methods reduce the jolt from gears being changed, they still involve the changing of gears between $1^{st}$ and $2^{nd}$ gear, which will include at least somewhat of a jolt due to the typically large difference in these gear ratios. Additionally, these methods place a large amount of stress on the clutch associated with first gear during vehicle launch, particularly when hauling a large load. As a result, a large amount of heat is typically generated in this clutch during vehicle launch.

In order to address these shortcomings and to generally eliminate the $1^{st}$ gear to $2^{nd}$ gear upshift, various methods for controlling a dual clutch transmission have been developed. However, all are associated with limitations.

SUMMARY OF THE INVENTION

It is a general object of the present invention to provide a method of controlling a transmission having a dual clutch system.

It is another object of the present invention to provide a method of controlling a motor vehicle transmission which substantially eliminates torque interruption associated with shifting between first and second gears.

It is another object of the present invention to provide a method of controlling a motor vehicle transmission that allows the vehicle to be launched with the transmission in a position to selectively provide for maximum power or greater fuel economy depending on vehicle loading or launch inertia.

It is another object of the present invention to dissipate heat generated in a transmission during launch of a vehicle through two clutch assemblies, thereby resulting in lower temperatures and greater clutch assembly durability.

In one form, the present invention provides a method of controlling a dual clutch transmission of a motor vehicle, wherein the first clutch acts to transmit torque to the first driven gear, and the second clutch acts to transmit torque to the second driven gear. The steps involved in controlling the transmission include the following: determining a predetermined first clutch slip value based on the perceived vehicle loading, initiating launch of the motor vehicle with both the first and the second clutch partially engaged, determining the vehicle inertia value based on the summation of instantaneous vehicle inertia values during vehicle launch, and controlling either the first or the second clutch to disengage when the predetermined first clutch slip value is reached.

The perceived vehicle loading is preferably determined at the outset based on the overall mass of the vehicle and occupants therein, although it may also be based on the perceived slope of the ground. Alternatively, the step of determining the first clutch slip value may occur after the vehicle launch is initiated, and the perceived vehicle loading may be based on either a series of instantaneous inertia measurements or an evaluation of the amount of engine torque transmitted.

The step of determining the vehicle inertia value preferably occurs during vehicle launch, although it could be based on a determination made before vehicle launch. The vehicle inertia value is preferably determined based on a summation of the instantaneous vehicle inertia values determined during vehicle launch, and each of the instantaneous vehicle inertia values are preferably based on a comparison of an instantaneous engine speed and the corresponding instantaneous vehicle speed.

The predetermined first clutch slip value is preferably a function of the perceived vehicle load. The perceived vehicle load is preferably determined from vehicle load measurements; however, it could be determined from other factors, such as a comparison of engine torque with vehicle speed during vehicle launch. The predetermined first clutch slip value is preferably determined by comparing the speed of the engine flywheel and the speed of the transmission input shaft associated with the first clutch; however, it could be determined in other ways such as by monitoring the position of an electromechanical first clutch actuator. When the predetermined first clutch slip value is reached, the step of controlling either clutch to disengage is preferably performed based on the vehicle inertia value. In order to accomplish this step, the transmission controller preferably evaluates the vehicle inertia value to determine whether the vehicle needs maximum power, in which case the controller directs the second clutch to disengage and the vehicle continues launching in the first driven gear, or whether it is appropriate to preserve fuel economy, in which case the controller directs the first clutch to disengage and the vehicle continues launching in the second driven gear.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein:

FIG. 2A is an illustration of the 2-4-6, hill holder cam profile.

FIG. 2B is an illustration of the R-1-3-5 cam profile.

FIG. 5 is an end view of the dual clutch assembly according to the principles of the present invention.

FIG. 12 is a sectional view of the R-1-3-5 shift actuator according to the principles of the present invention.

FIG. 13 is a sectional view of the 2-4-6-Hill Holder shift actuator according to the principles of the present invention.

FIG. 14 is an illustration of the cam grooves provided in the 2-4-6-Hill Holder shifter cam according to the principles of the present invention.

FIG. 15 is an illustration of the cam grooves of the R-1-3-5 shifter cam according to the principles of the present invention.

DETAILED DESCRIPTION OF THE PREFERRED EMBODIMENTS

Figure 1:
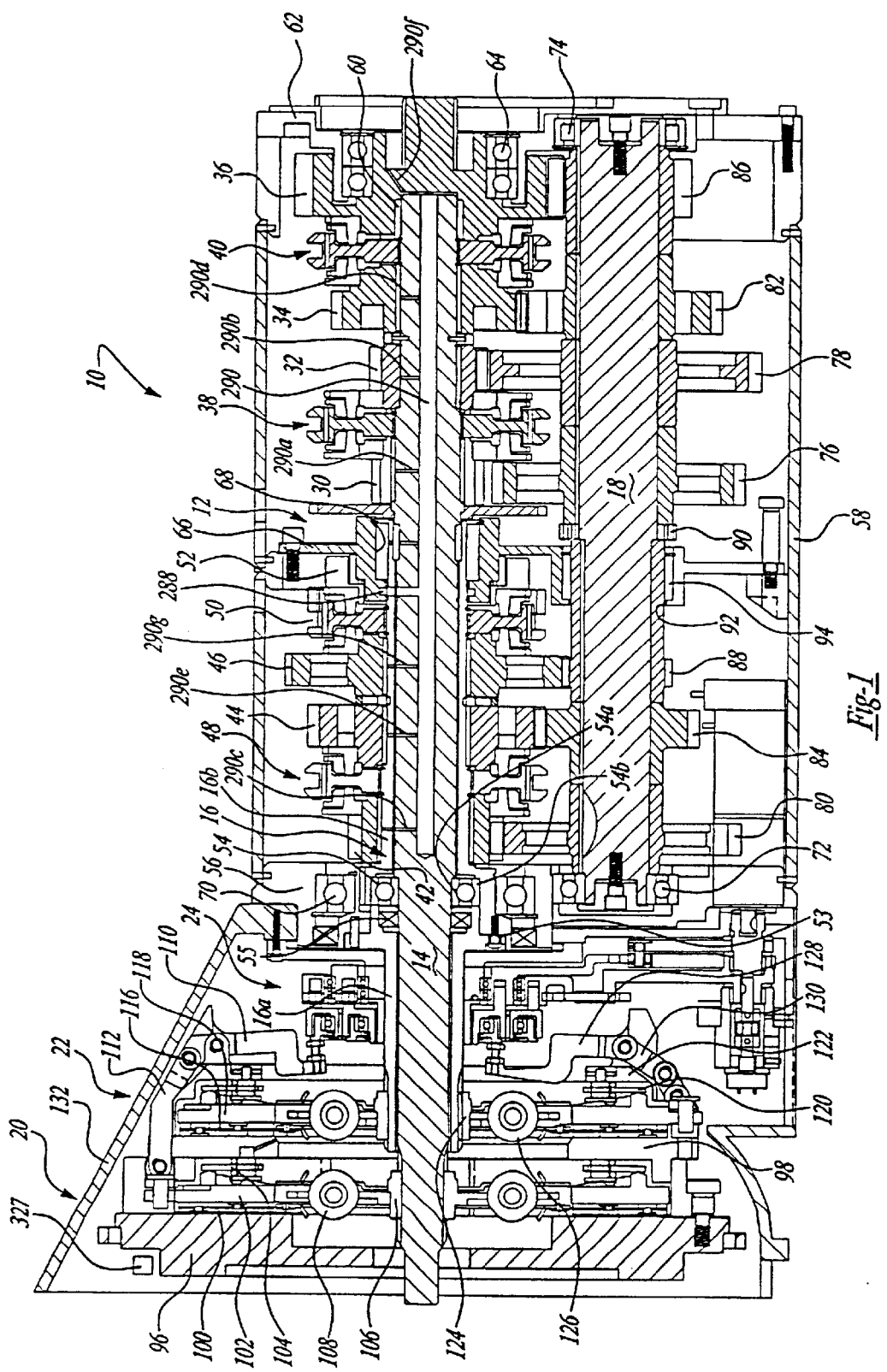
FIG. 1 is a sectional view of an electromechanical automatic transmission of the type controlled by the method according to the principles of the present invention.

The present invention pertains to a method of controlling a dual clutch transmission. Although the present invention is applicable to any virtually dual clutch transmission, the method of the preferred embodiment is illustrated with the electromechanical automatic transmission disclosed in commonly assigned U.S. Pat. No. 6,012,561, which is hereby incorporated by reference as if fully set forth herein. Accordingly, with reference to the accompanying drawings, the electromechanical automatic transmission 10 having dual clutches, and the method of controlling a dual clutch transmission during vehicle launch 410, according to the principles of the present invention, will now be described. The exemplary electromechanical automatic transmission 10 will be addressed first, with particular reference to FIGS. 1–22; the methods of controlling a dual clutch transmission during vehicle launch 410 will discussed thereafter with particular reference to FIGS. 23–27.

Accordingly, the electromechanical automatic transmission 10 is provided with a gear train 12 which includes a first input shaft 14 and a second hollow input shaft 16 which is concentric with the first input shaft 14. Each of the input shafts 14, 16 support a plurality of rotatably mounted drive gears which are engaged with respective driven gears mounted to a driven shaft 18. A first friction clutch 20 is provided for transmitting torque from the engine output shaft (not shown) to the first input shaft 14. A second friction clutch 22 is provided for transmitting drive torque from the engine output shaft 16. A dual cam assembly 24, along with first and second clutch actuators 26, 28 (see FIGS. 3–4 and 6–10) are provided for selectively disengaging the first and second friction clutches 20, 22.

The gear train 12 includes a reverse 30, first 32, third 34, and fifth 36 speed gears rotatably mounted to the first input shaft 14. A reverse-first synchronizer device 38 is provided for selectively engaging the reverse gear 30 and first speed gear 32 to the first input shaft 14. A third-fifth synchronizer device 40 is provided for selectively engaging the third and fifth speed gears 34, 36 to the first input shaft 14. Section 42, fourth 44, and sixth 46 speed gears are rotatably mounted to the second input shaft 16. A second-fourth synchronizer device 48 is provided for selectively engaging the second and fourth speed gears, 42, 44, respectively to the second input shaft 16. A sixth speed/hill holder synchronizer device 50 is provided for selectively engaging the sixth speed gear 46 to the second input shaft 16. In addition, the sixth, speed/hill holder synchronizer 50 also engages an overrunning one-way clutch (Hill-Holder) device 52 for preventing the vehicle from rolling backward down a hill.

The first input shaft 14 is supported by a bearing assembly 54. Bearing assembly 54 has an inner race 51a supported on the first input shaft 14 and an outer race 54b, supported on the second input shaft 16. The second input shaft 16 includes a two-piece construction with a first shaft portion 16A and a second shaft portion 16B, each fastened together by a plurality of fasteners and/or pins 53 generally in the vicinity of the bearing 54. In addition, a seal 55 is provided between the first shaft portion 16A of the second input shaft 16 and the first input shaft 14. At a second end, the first input shaft 14 is supported by a needle bearing assembly 60 disposed within a central hub portion of fifth speed gear 36. Fifth speed gar 36 is supported by the end plate 62 via a bearing assembly 64. A center plate 66 is provided within the housing 58 and is provided with an opening 68 through which the first and second input shafts 14, 16 extend. The second input shaft 16 is supported within a front plate 56 of the transmission housing 58 via a bearing assembly 70 which is generally concentric with bearing 54. The driven shaft 18 is supported at a front end by the front plate 56 via a bearing assembly 72 and at a rear end by the end plate 62 via a bearing assembly 74. The driven shaft 18 is provided with a reverse driven gear 76, a first speed driven gear 78, a second speed driven gear 80, a third speed driven gear 82, a fourth speed driven gear 84, a fifth speed driven gear 86, a sixth speed driven gear 88, and a parking gear 90. The driven shaft 18 extends through an opening 92 in center plate 66 and is supported by needle bearing assembly 94.

The first input shaft 14 is drivingly engaged with the engine output shaft via first clutch 20, while second input shaft 16 is engaged with the engine output shaft via second clutch 22. The first and second clutches 20, 22 include a flywheel assembly including a first flywheel 96 which is mounted to the engine output shaft (not shown). A second flywheel 98 is mounted to the first flywheel 96 for rotation therewith. The first clutch 20 includes a friction plate 100 disposed between the first flywheel 96 and a pressure plate 102. Pressure plate 102 is biased by a Belleville spring 104 into a normally engaged position. The friction plate 100 is engaged with a hub portion 106 which is mounted to the first input shaft 14 via a spline connection. A torsion spring system 108 is provided between the friction plate and the hub 106, as is well known in the art. A plurality of levers 110 engage the dual cam assembly 24 and are attached to linkages 112 which are attached to the pressure plate 102 for disengaging the pressure plate 102 from the friction plate 100 in order to disengage the first clutch 20 upon actuation of the clutch actuator 28 and dual cam assembly 24. Levers 110 pivot about pivots 113 which are attached to the clutch cover plate 122. Linkages 112 are attached to the levers 110 by a pivot 114 and to the pressure plate 102 at pivot 115. As the levers 110 are pivoted about pivots 113 by the dual cam assembly 24, linkages 112 are pulled in a direction away from the first flywheel 96', thereby disengaging the first clutch 20.

The second clutch 22 similarly includes a friction plate 116 which is disposed between the second flywheel 98 and a pressure plate 118. A Belleville spring 120 is provided between the pressure plate 118 and a clutch cover plate 122. The second clutch 22 includes a hub 124 which is connected to the second input shaft 16 by a spline connection. The friction plate 116 is connected to the hub 124 via a torsion spring assembly 126, as is known in the art. A plurality of disengagement levers 128 engage the dual cam assembly 24 and are attached to a plurality of linkages 130 and are operable in order to disengage the second clutch 22. The disengagement levers 128 pivot about pivots 129 which are attached to the clutch cover plate 122. Linkages 130 are attached to the levers 128 by a pivot 131 and to the pressure plate 118 at pivot 133. As the levers 128 are pivoted about pivots 129 by the dual cam assembly 24, the linkages 130 are pulled in a direction away from the second flywheel 98 thereby disengaging the second clutch 22.

Figure 3:
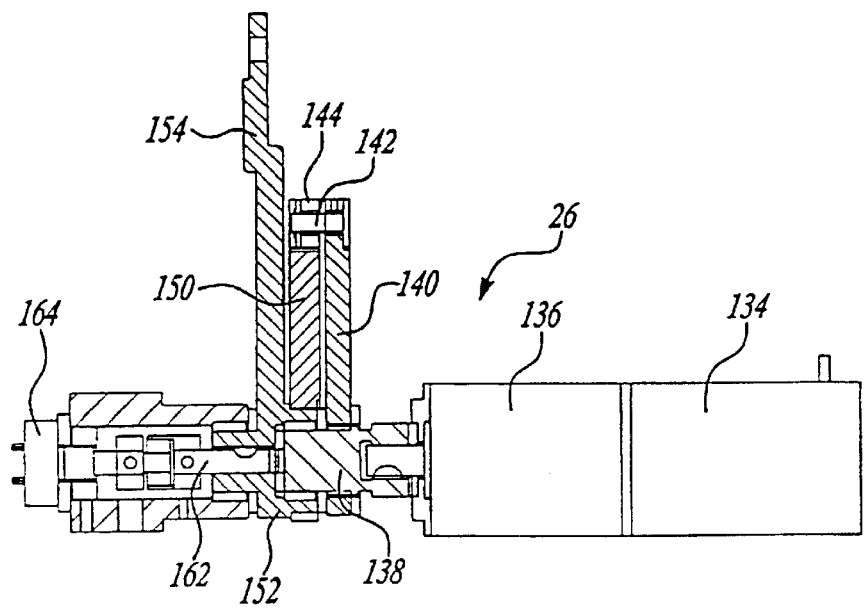
FIG. 3 is a side view of the R-1-3-5 side clutch actuator according to the present invention.
Figure 4:
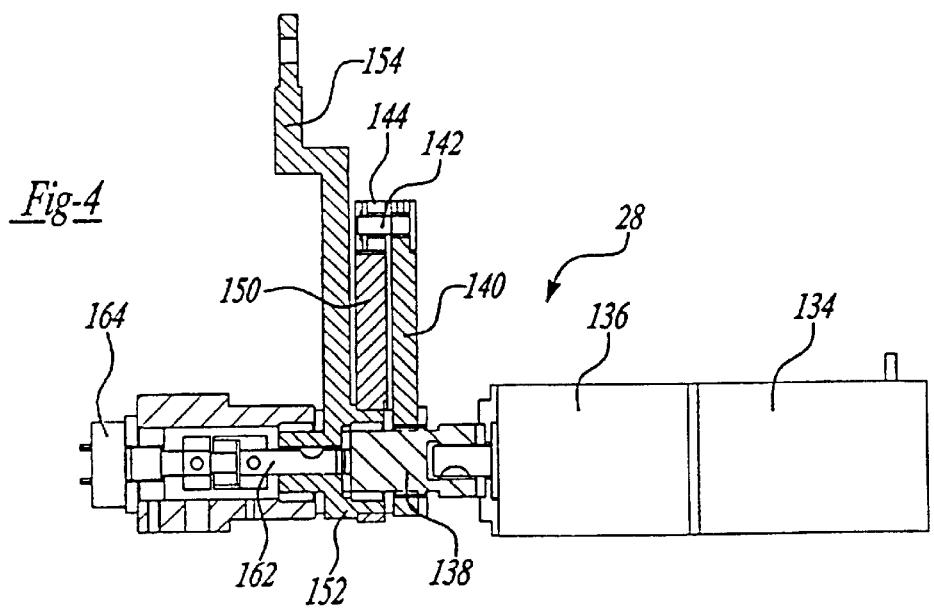
FIG. 4 is a side view of the 2-4-6 hill holder side clutch actuator according to the present invention.

The first and second clutches 20, 22 are supported within a bell housing 132 by the flywheel 96 along with the dual cam assembly 24 and clutch actuators 26, 28 which are supported by the bell housing 132. The flywheel 96 is supported by the engine output shaft (not shown). With reference to FIGS. 3 and 4, the clutch actuators 26 and 28 will now be described. it should be understood that the left and right side clutch actuators 26, 28 are virtually identical in their construction. Accordingly, a single description with respect to the right and left side clutch actuators 26, 28 will be provided wherein like reference numerals designate common elements. The clutch actuators 26, 28 include an electric motor 134 which drives a planetary reduction gear assembly 136. The planetary reduction gear assembly 136 is provided with a splined output shaft which engages a corresponding splined shaft 138. A pawl teeter arm 140 is mounted to the splined shaft 138 for rotation therewith. A pivot pin 142 is provided in the end of the pawl teeter arm 140. A pawl teeter assembly 144 is mounted to the pivot pin 142 and is provided with a pawl 146 at one end thereof and a roller 148 at a second end thereof, as best seen in FIGS. 7–10. The pawl 146 engages an adjuster plate 150 which is provided with a semicircular radial outermost surface having a plurality of teeth provided therein. The adjuster plate 150 is mounted to a hub portion 152 of a pivot arm 154. The pivot arm 154 of the right and left side clutch actuators 26, 28 are each attached to a link 156 which is attached to a cam retainer lever 158, 160 of the dual cam assembly 24, as shown in FIGS. 6–10. The pivot arm 154 is provided with a shaft extension 162 which is connected to a potentiometer 164 which measures the position of the pivot arm 154.

Figure 2:
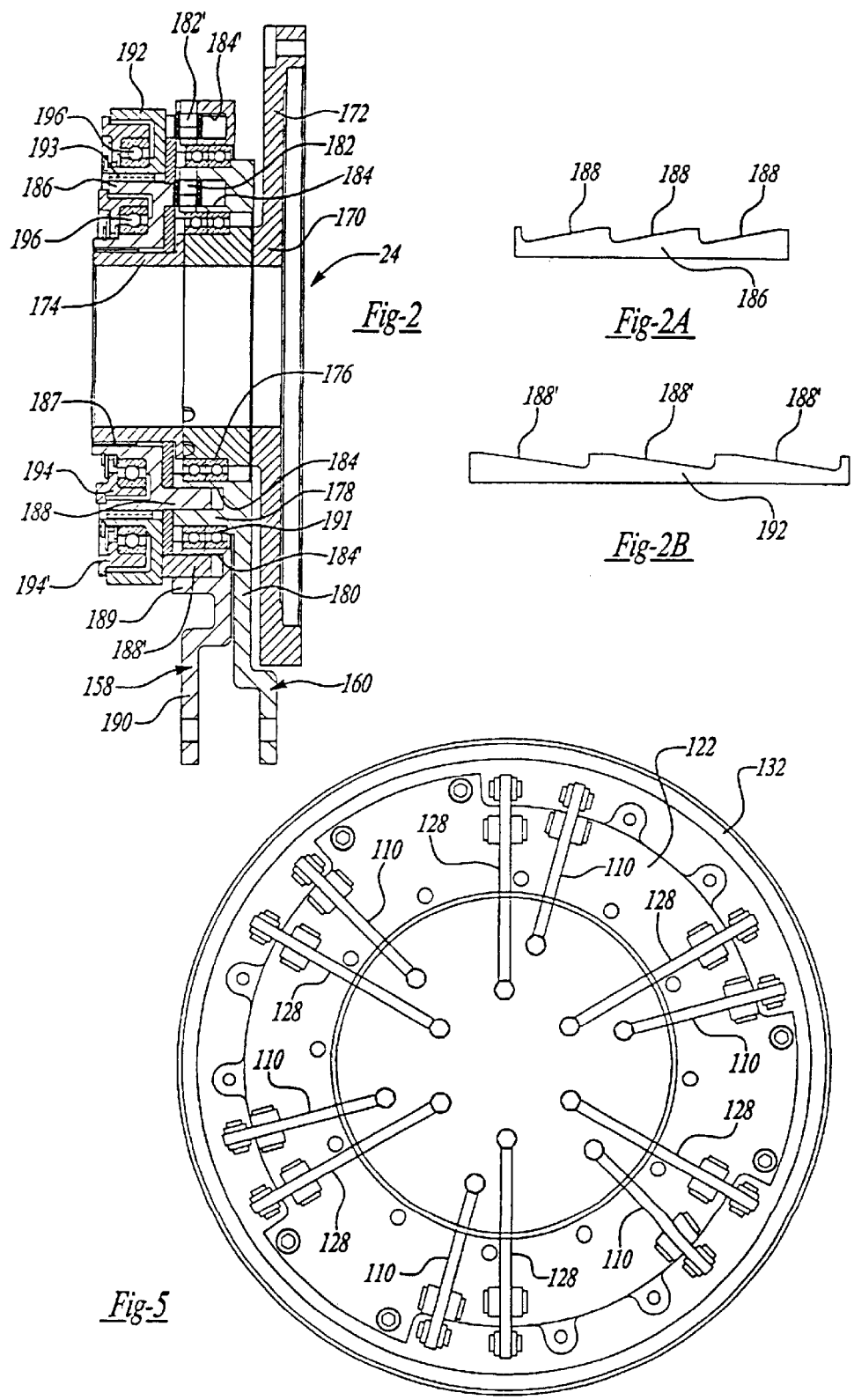
FIG. 2 is a detailed cross-sectional view of the dual cam assembly used for disengaging the dual clutch assemblies according to the principles of the present invention.

As mentioned above, the pivot arms 154 of the right and left side clutch actuators 26, 28 are attached to links 156 which are in turn connected to cam retainer levers 158, 160 of dual cam assembly 24. With reference to FIG. 2, the dual cam assembly 24 will be described in greater detail. The dual cam assembly 24 is provided with a clutch ramp hub 170 which is provided with a flange portion 172 which mounts to the front plate 56 and a cylindrical body portion 174. The 2-4-6 cam retainer lever 160 is rotatably mounted to the cylindrical body portion 174 of clutch ramp hub 170 via a bearing assembly 176. The cam retainer lever 160 includes a ring-shaped body portion 178 and a lever arm portion 180 extending radially therefrom. The ring portion 178 of cam retainer lever 160 supports a plurality of cam rollers 182 along annular groove 184. A cam ring 186 is provided with a plurality of axially extending cam surfaces 188 which engage the cam rollers 184. FIG. 2A provides an illustration of the profile of the cam surfaces 188 of the cam ring 186. In this embodiment, the profile includes three cam surfaces 188 which each correspond to a cam roller 182. The cam ring 186 is slidably connected to the clutch ramp hub 170 by axial splines 187, wherein the rotation of cam retainer lever 160 relative to cam ring 186 causes the cam ring 186 to move axially relative to the clutch ramp hub 170 as the cam rollers 182 traverse against the sloped cam surfaces 188.

The R-1-3-5 cam retainer lever 158 includes a ring shaped body portion 189 and a lever arm portion 190 extending radially therefrom. The ring shaped body portion 189 is provided with a bearing assembly 191 on the radial surface of the 2-4-6 cam retainer lever 160 so that the cam retainer lever 158 can rotate relative to the cam retainer lever 160. The cam retainer lever 158 also supports a plurality of cam rollers 182' along annular groove 184'. Each cam roller 182' corresponds with a sloped cam surface 188' of an outer cam ring 192. FIG. 2B provides an illustration of the profile of the cam surfaces 188' of the outer cam ring 192. In this embodiment, the profile includes three cam surfaces 188' which each correspond to a cam roller 182'. The outer cam ring 192 is splined to the inner cam ring 186 at 193 and is capable of moving axially relative thereto. Upon rotation of the cam retainer lever 158, the cam surfaces 188' move in engagement with cam rollers 182' to cause the outer cam ring 192 to move axially relative to the clutch ramp hub 170. The inner cam ring 186 and outer cam ring 192 are each provided with a cam release pad 194, 194' which is rotatably supported by the inner and outer cam rings 186, 192, respectively, via a bearing assembly 196, 196'. An O ring retainer 198, 198' and a retaining ring 200, 200' are provided for retaining the cam release pads 194, 194' in position relative to the inner and outer cam rings 186, 192. With reference to FIG. 1, the lever 110 of first clutch 20 and lever 128 of second clutch 22 each include an end portion which engage the cam release pads 194, 194' of the dual cam assembly 24. Accordingly, by rotation of cam retainer levers 158, 160 causing axial movement of cam release pads 194, 194', selective disengagement of the first and second clutch assemblies 20, 22 can be obtained.

Figure 6:
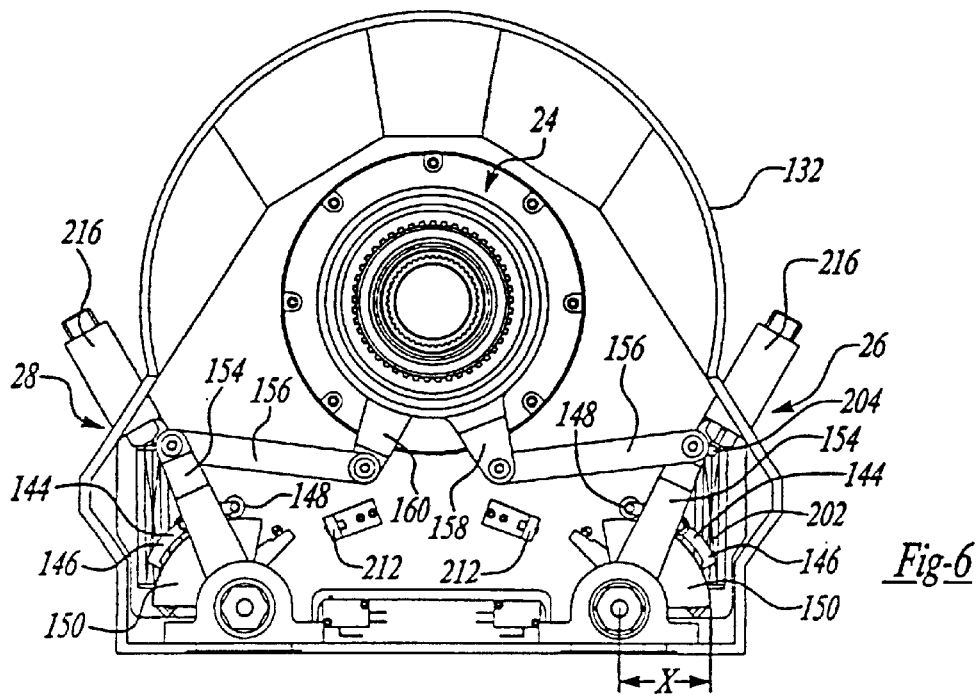
FIG. 6 is an end view of the clutch actuator assembly and dual cam assembly according to the principles of the present invention with each of the clutch actuator assemblies in the disengaged position.
Figure 7:
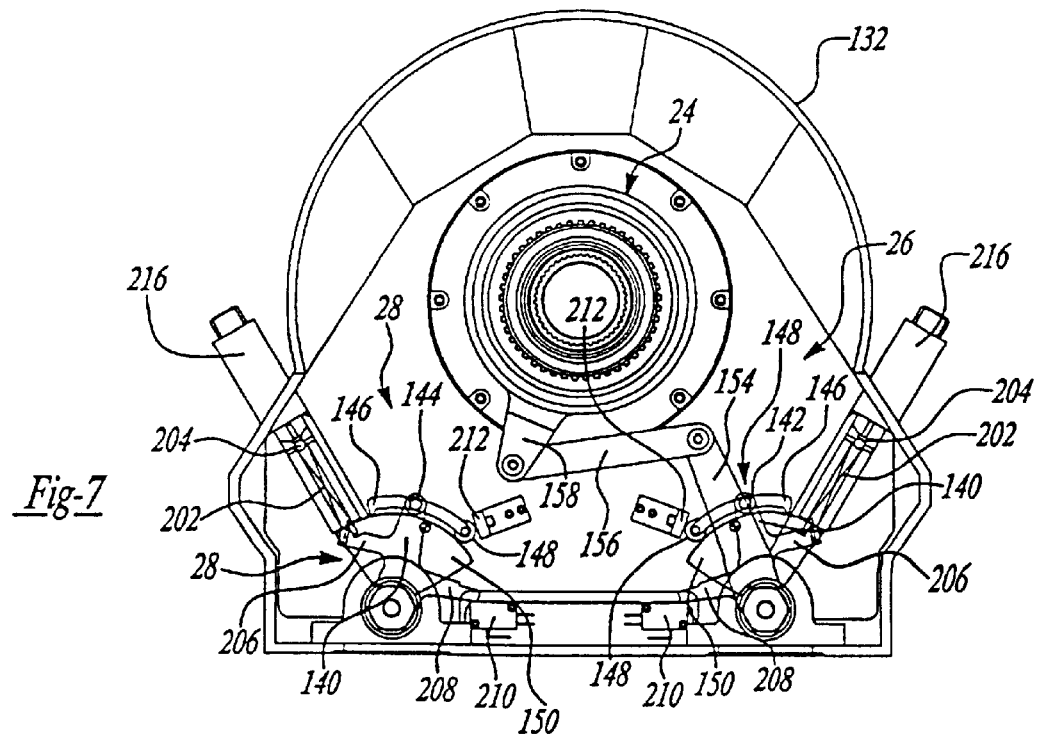
FIG. 7 is an end view of the clutch actuator and dual cam assembly as shown in FIG. 6, with the right side clutch actuator in the disengaged position.
Figure 8:
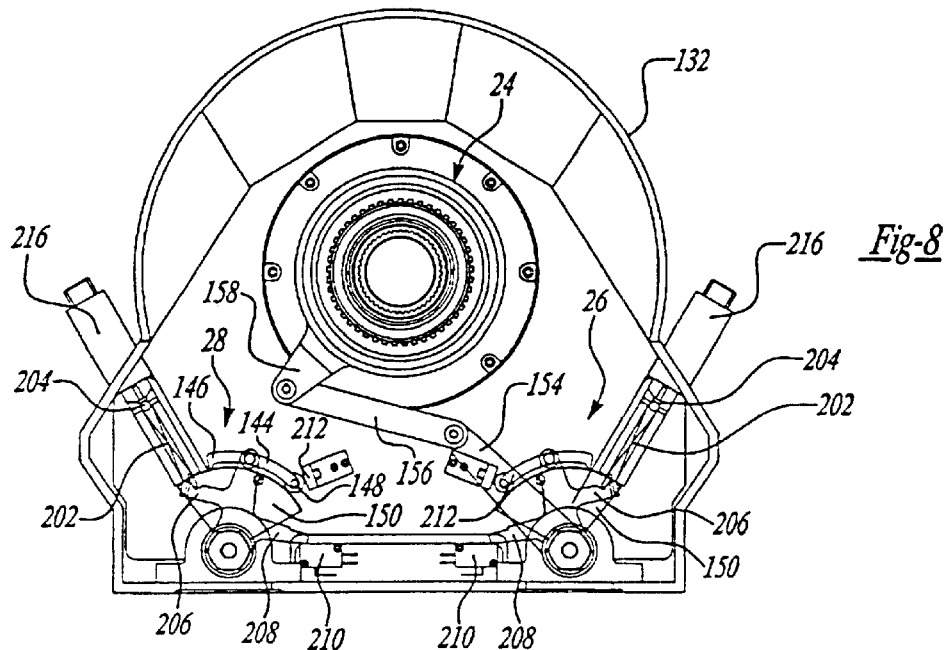
FIG. 8 is an end view of the clutch actuator assembly and dual cam assembly, with the right side clutch actuator in the adjust position.

With reference to FIGS. 6–10, the operation of the clutch actuators for engaging the first and second clutches 20, 22 will be described. As shown in FIG. 6, each of the clutch actuators 26, 28 are shown in the disengaged position. Each clutch actuator 26, 28 is provided with an assist spring 202 which is adjustably mounted at a first end to the bell housing 132 by a ball socket joint 204 and which is connected at a second end to an assist arm 206 which extends from the pawl teeter arm 140, as best shown in FIGS. 7–10. The assist springs 202 can be adjusted via a spring adjustment device 216 which can include, for example, a threaded adjustment apparatus for continuously variable adjustment of the compression amount of the assist spring 202. The pawl teeter arm 140 is also provided with a switch activation arm 208 which engages a switch 210 which shuts off the electric motor 134 of the actuators 26, 28. The assist spring 202 is designed so as to provide an increasing assist force as the pawl teeter arm 140 is rotated from the engaged to the disengaged positions. In other words, as shown in FIG. 7, the spring force of the assist spring 202 acts through the axis of rotation of the pawl teeter arm 140. As the electric motor 134 drives the pawl teeter arm 140, the moment arm upon which the assist spring 202 acts upon the pawl teeter arm 140 increases with the rotation of the pawl teeter arm 140. This can best be seen in FIG. 6 wherein the pawl teeter arm 140 in the disengaged position is rotated so that the assist spring 202 acts on a large moment arm X in order to provide a large assist force. The need for the increasing assist force is due to the increasing spring force of the Belleville springs 104 and 120 which bias the pressure plates 102 and 118 of first and second clutches 20, 22, respectively, into the normally engaged position. Accordingly, as the pressure plates 102, 118 are moved away from the engaged position, the force of the Belleville springs 104, 120 increases. Thus, in order to consistently reduce the required motor force for disengaging the clutches 20, 22, the assist spring 202 and increasing moment arm arrangement of the present invention provides a consistently increasing assist force.

Figure 9:
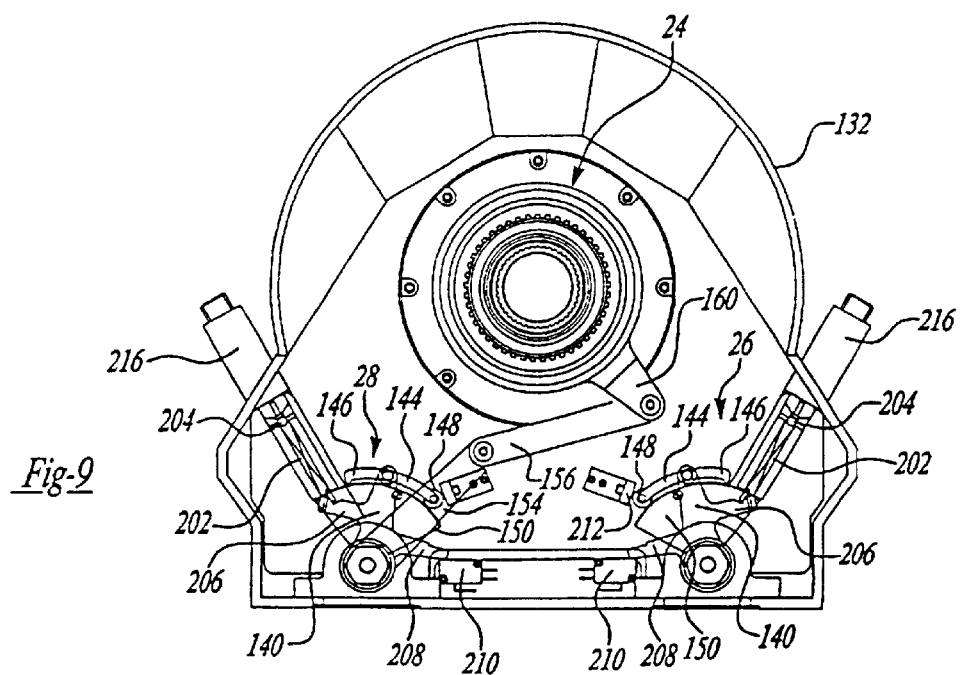
FIG. 9 is an end view of the clutch actuator and dual cam assembly as shown in FIG. 6, with the left side clutch actuator in the disengaged position.
Figure 10:
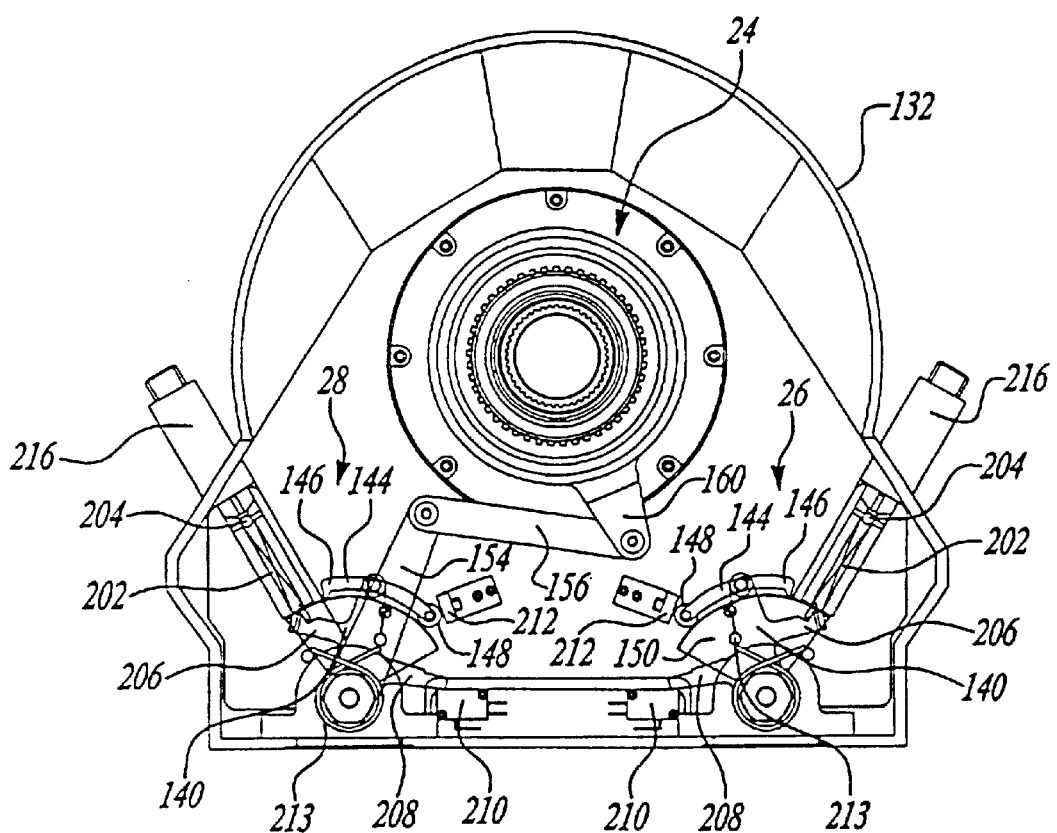
FIG. 10 is an end view of the clutch actuator assembly and dual cam assembly, with the left side clutch actuator in the adjust position.

Upon rotation of the pawl teeter arm 140, the pawl 146 of the pawl teeter assembly 144 transmits torque to the adjuster plate 150 and pivot arm 154 which is mounted for rotation therewith. When the clutch actuators 26, 28 are in the normally engaged position such as shown in FIGS. 7 and 9, respectively, the switch activation arm 208 rests against the switch 210 and the roller 148 of pawl teeter assembly 144 rests against the stop surface 212.

As the clutch discs wear down, the clutch actuators 26, 28 are provided with an automatic adjustment feature wherein as the roller 148 of pawl teeter assembly 144 rests against the stop surface 212, the pawl 146 is allowed to disengage from the serrated teeth of the adjuster plate 150 so that the adjuster plate 150 is free to move relative to the pawl teeter assembly 144. Preload springs 213 are provided to apply a tension force between the adjuster plate 150 and the pawl teeter arm 140 in order to preload the adjuster plate 150 and thus bring the dual cam assembly to the fully engaged position. Accordingly, as the clutch disks wear down, the adjuster plates 150 rotate further as biased by the preload spring 213 during the adjustment in order for the clutch to become fully engaged. Upon subsequent activation of the clutch actuator, the pawl 146 will re-engage with the adjuster plate 150 and the clutch actuator is automatically adjusted to compensate for wear of the clutch disks. Thus, clutch clamp load and torque capacity are maintained. The clutch actuators 26, 28 are mounted to the housing 132 by clutch actuator mounts 214. It should be readily understood to one of ordinary skill in the art that the operation of the left and right clutch actuators 26, 28 is identical and that further description with respect to the left and right clutch actuators 26, 28 is unnecessary in view of this similarity of operation.

Figure 11:
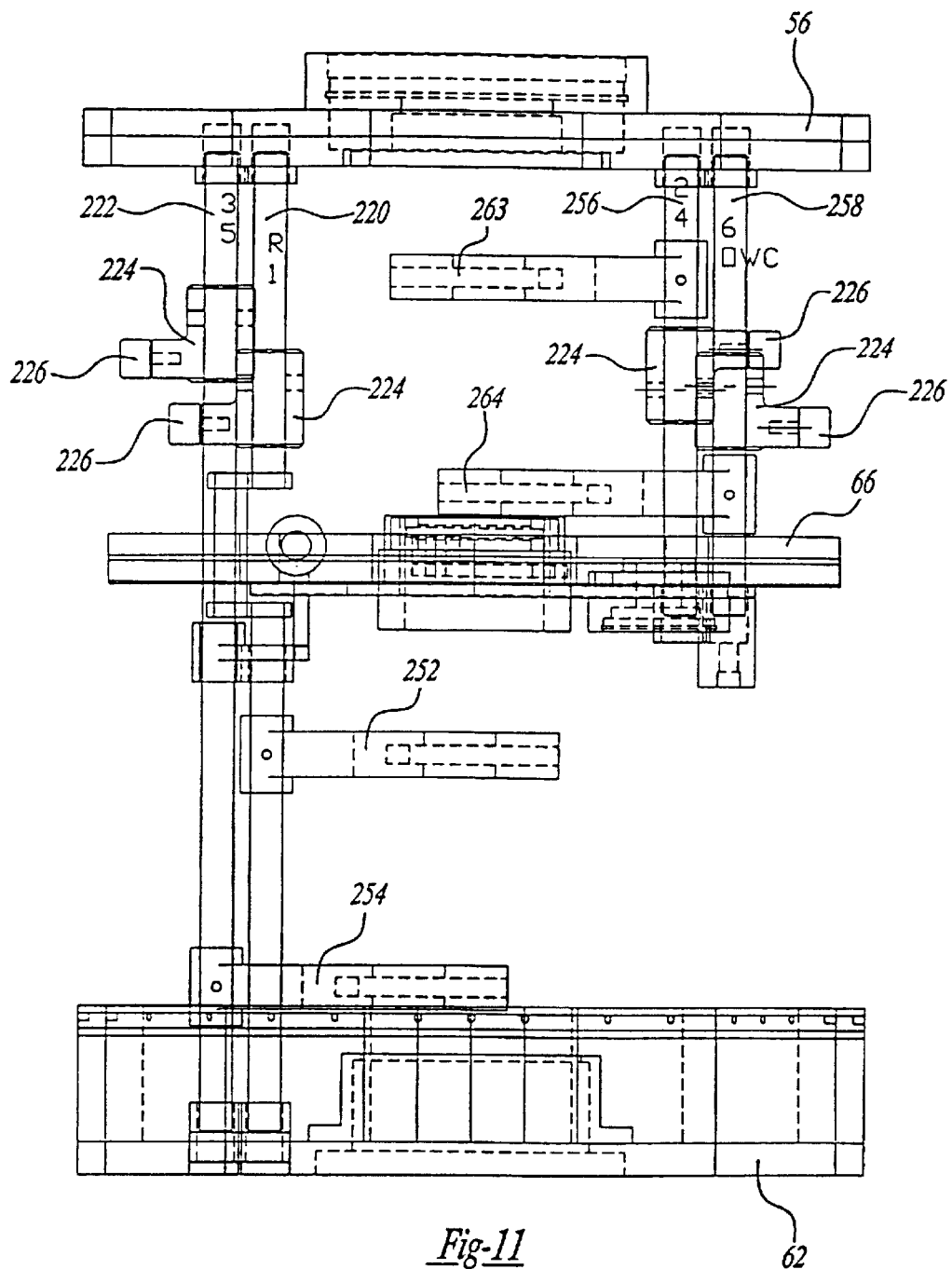
FIG. 11 is a top view of the shift rail assembly according to the principles of the present invention.
Figure 16:
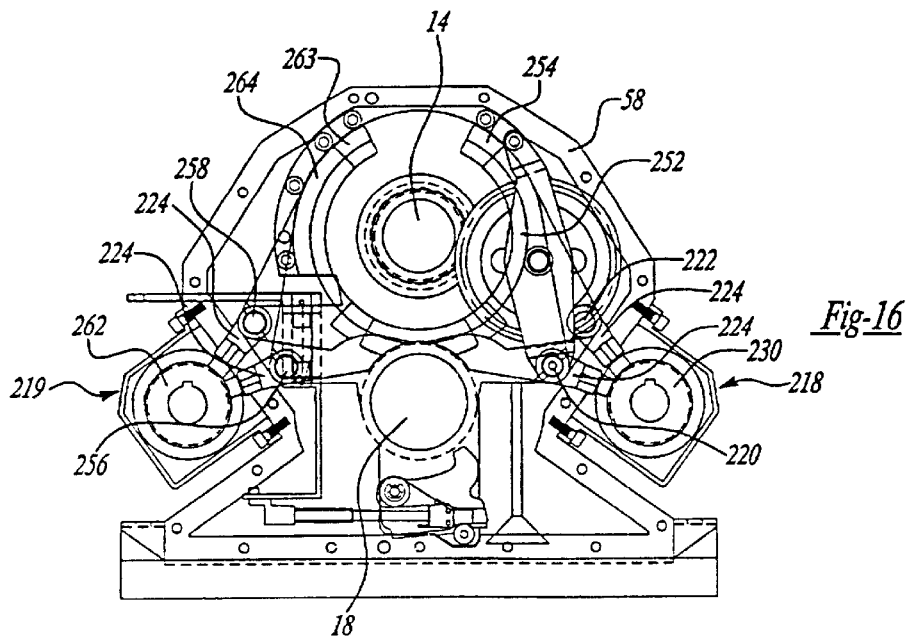
FIG. 16 is an end view of the electromechanical automatic transmission according to the principles of the present invention, with parts removed in order to illustrate the shift actuators, parking brake, and reverse idler gear/lube pump mechanism according to the principles of the present invention.

The shift actuators 218, 219, according to the present invention will now be described with reference to FIGS. 11–16. The electromechanical automatic transmission 10, according to the present invention, is provided with a first shift rail 220 and a second shift rail 222 each provided with a shift lug 224 securely fastened to the shift rails and each having a cam roller 226 (as shown in FIG. 12) which operatively engage can grooves 228 provided in a barrel-shaped shifter cam 230 of the R-1-3-5 shift actuator 218. The configuration of the cam grooves 228 for the R-1-3-5 shift actuator 218 is shown in FIG. 15. As shown in FIG. 12, the R-1–5 shift actuator 218 includes an electric motor 234 which drives a planetary reduction gear assembly 236. The planetary reduction gear assembly 236 drives a shaft 238 which is connected to the shifter cam 230 by a keyway 240. The shifter cam 230 is provided within a housing 242 and is supported by a pair of bearings 244. A potentiometer 246 is provided for measuring the position of the shifter cam 230. The potentiometer 246 is connected to the shaft 238 by a coupler 248 which is disposed within a housing extension 250. The shifter cam 230, upon rotation, drives shift lugs 224 mounted on first and second shift rails 220, 222 for selectively moving the shift rails and thus the shift forks 252, 254 mounted to the shift rails 220, 222, respectively, as shown in FIG. 11. The shift fork 252 is associated with the reverse-first gear synchronizer device 38. The shift fork 254 is associated with the third-fifth gear synchronizer 40.

The electromechanical automatic transmission is also provided with third and fourth shift rails 256, 258, respectively, which are each provided with a shift lug 224 securely mounted to each shift rail 256, 258. Each shift lug 224 includes a cam roller 226 which operatively engage cam grooves 260 provided in the shifter cam 262 of shift actuator 219, as shown in FIG. 13. The cam grooves 260 for the shift actuator 219 are shown in FIG. 14. A 2-4 shift fork 263 is mounted on the shift rail 256 for actuating the second-fourth speed synchronizer 48. A sixth-Hill Holder shift fork 264 is mounted to the shift rail 258 for selectively engaging the sixth-Hill Holder synchronizer 50. With reference to FIG. 13, the 2-4-6 shift actuator 219 has substantially the same construction as the R-1-3-5 shift actuator 218 shown in FIG. 12.

Figure 17:
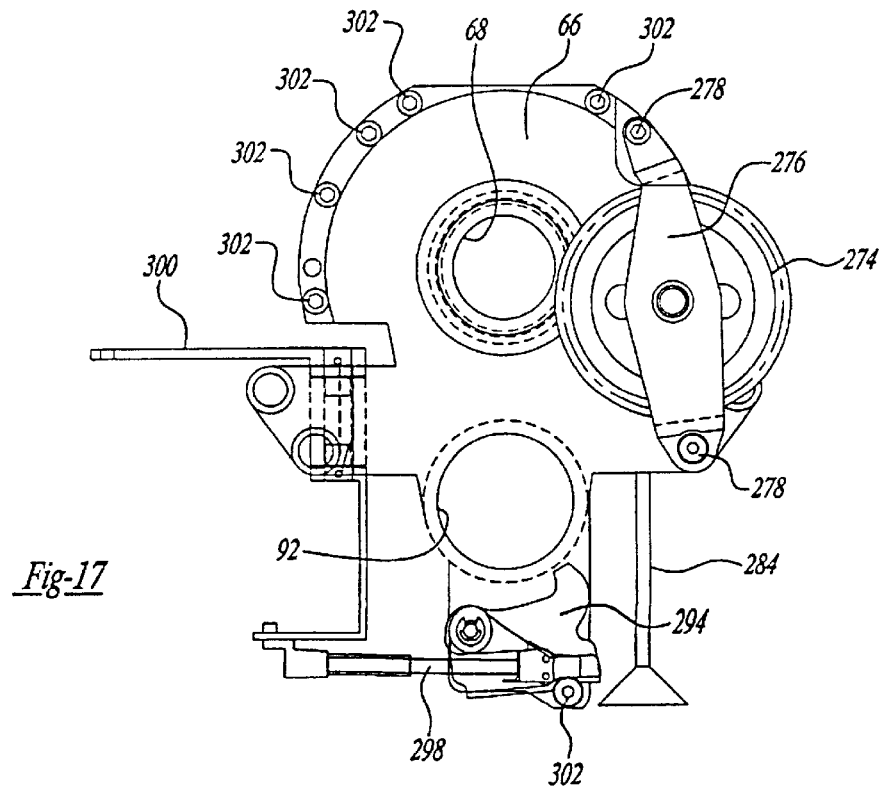
FIG. 17 is a plan view of the center plate with the parking sprag and reverse idler assembly mounted thereto.
Figure 18:
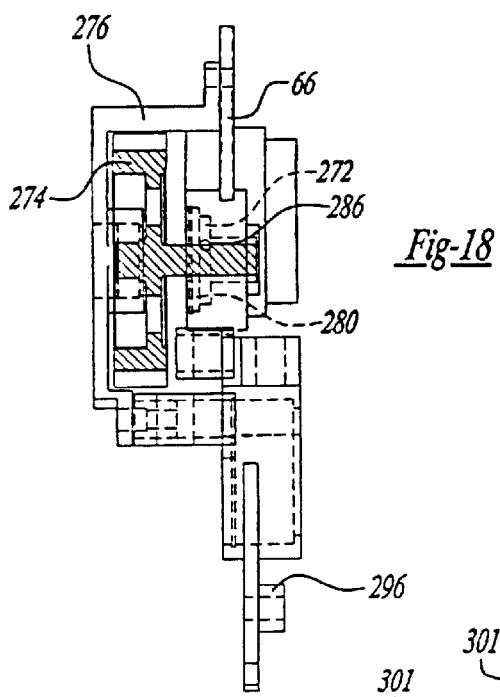
FIG. 18 is a cross-sectional view of the center plate taken through the reverse idler gear/pump mechanism.
Figure 19:
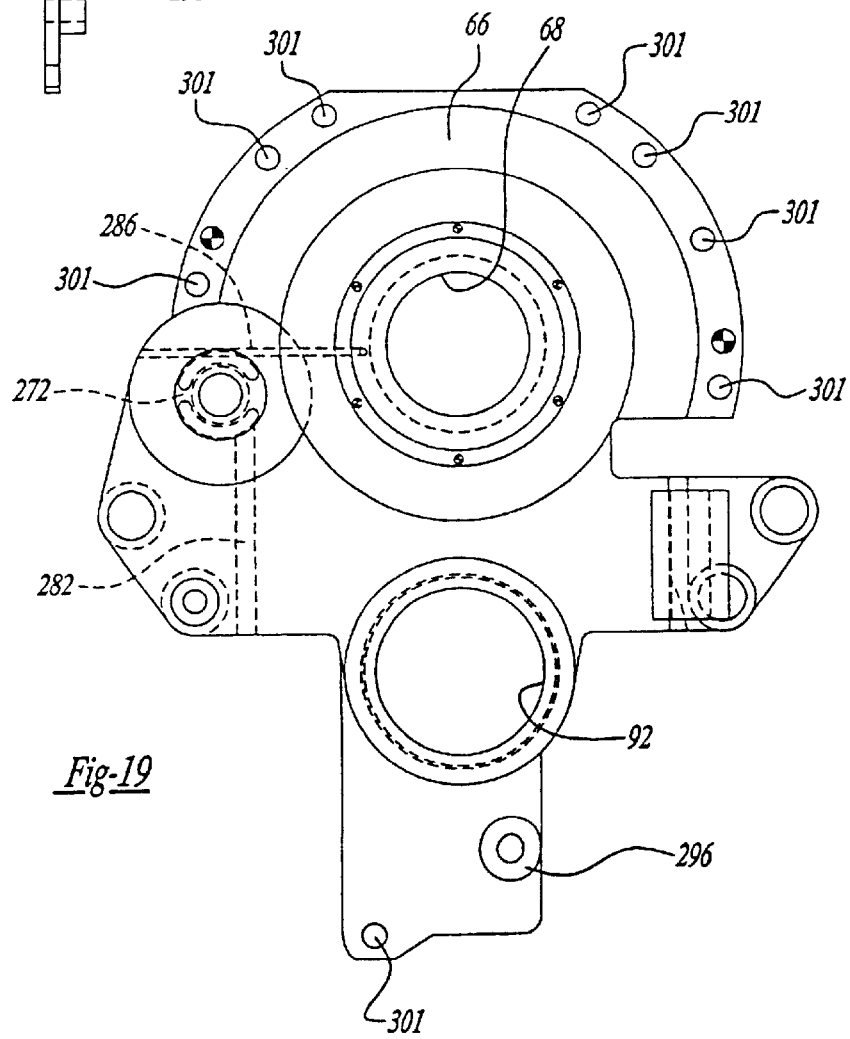
FIG. 19 is a plan view of the front side of the center plate, illustrating the lubrication passages provided therein for communication between the geroter pump and the lubrication passage provided in the first input shaft.
Figure 20:
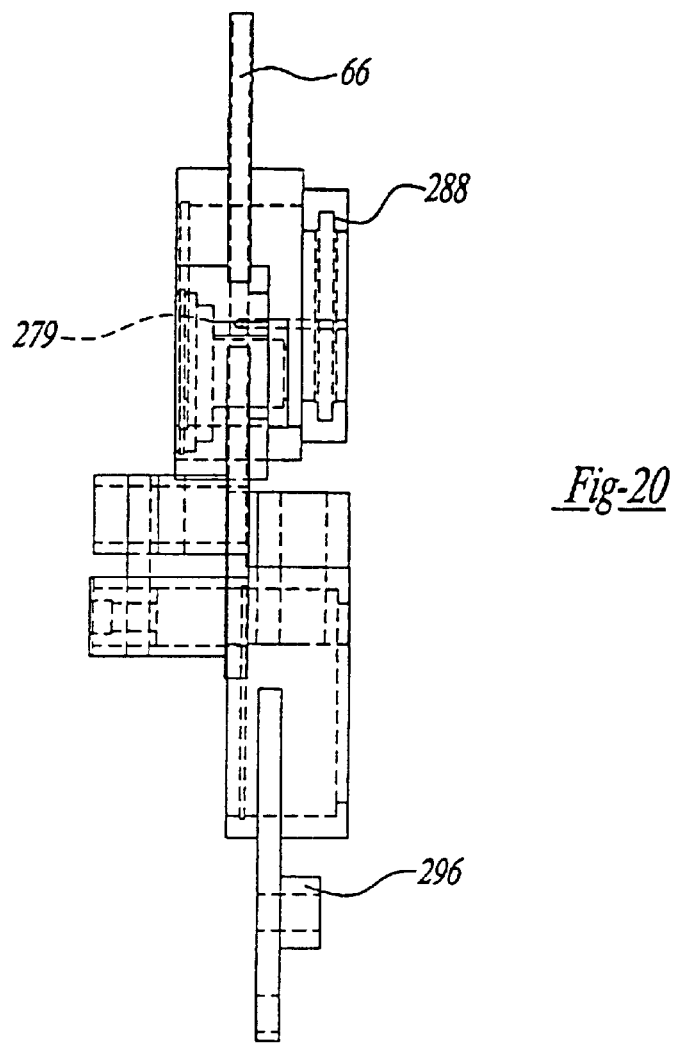
FIG. 20 is a side view of the center plate shown in FIG. 19.
Figure 21:
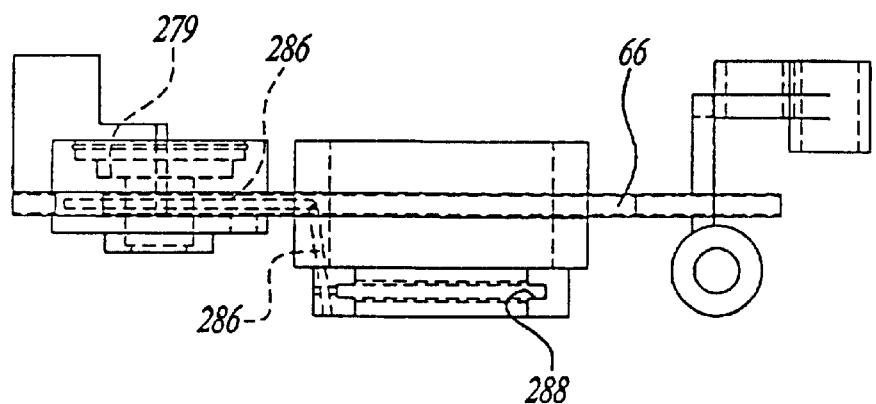
FIG. 21 is a top view of the center plate shown in FIG. 19.

With reference to FIGS. 1 and 17–21, the lubrication system of the present invention will be described. The lubrication system includes a gerotor pump 272 (best shown in FIGS. 18 and 19) mounted to the center plate 66 and driven by the reverse idler gear 274. The reverse idler gear 274 is mounted to the center plate 66 by a mount bracket 276 which is mounted to the center plate 66 by a pair of fasteners 278, as shown in FIG. 17. The reverse idler gear 274 is engaged with the reverse drive gear 30 and reverse driven gear 76. The reverse idler gear 274 is provided with a center shaft 304 which is mounted to the mount bracket 276 and is provided with bearing assemblies 306 for supporting the center shaft 304. The gerotor pump 272 is attached to the center shaft 304 and is provided within a pump chamber 279 and is provided with a cover 280. An oil passage 282 is provided in communication with the gerotor pump 272 and receives oil from an oil pick-up tube 284, as shown in FIG. 17. A second oil passage 286 is in communication with the outlet of the gerotor pump 272 and a lubrication groove 288 which communicates lubrication fluid to a lubrication passage 290 in the first input shaft 14. The first input shaft 14 is provided with radial passages 290a–290g which communicate with the lubrication passage 290 for providing lubrication to the reverse gear 30 and first through sixth gears 32, 42, 34, 44, 36, 46. A parking sprag 294 is provided for engaging the parking gear 90 provided on the driven shaft 18. The parking sprag 294 is mounted to the center plate 66 by a mount boss 296. The parking sprag 294 is attached to a rod assembly 298 which is attached to a parking lever engagement assembly 300. The center plate 66 is provided with a plurality of mounting holes 301 for receiving threaded fasteners 302 for mounting the center plate 66 to the housing 58.

Figure 22:
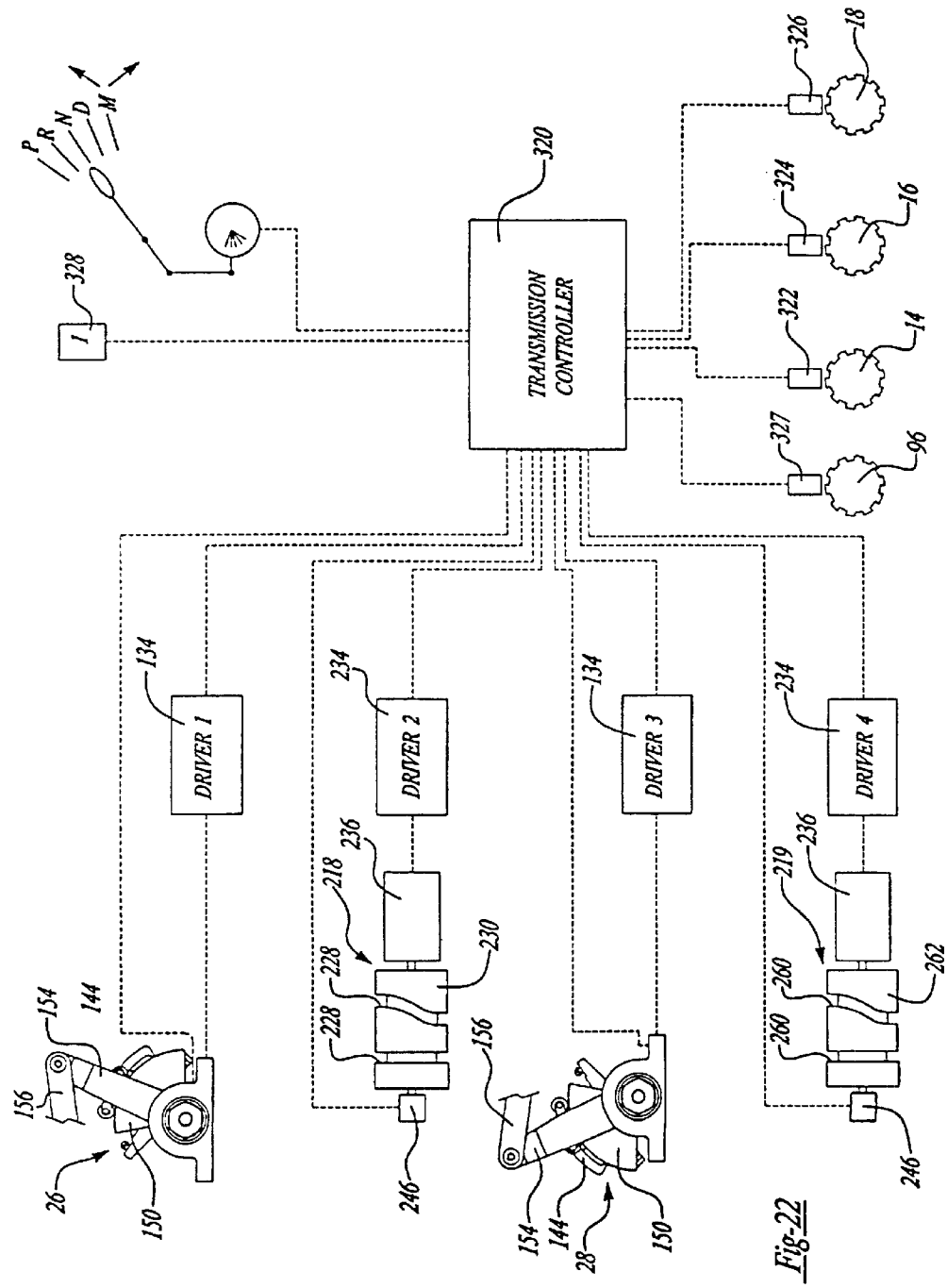
FIG. 22 is a schematic illustration of the control system for the electromechanical automatic transmission according to the principles of the present invention.
Figure 23:
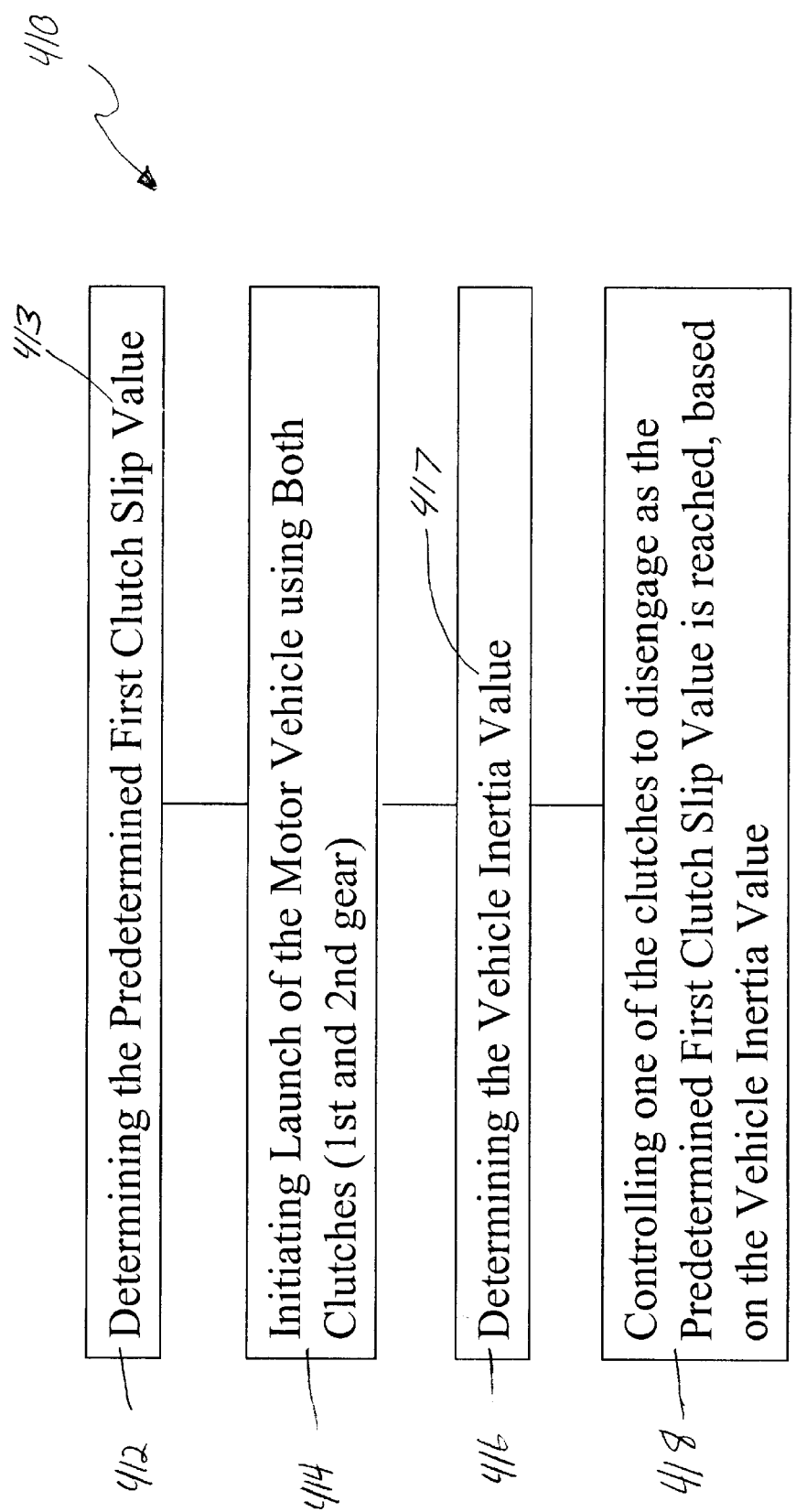
FIG. 23 is a flow diagram illustrating the steps of the method of the present invention in accordance with a first preferred embodiment.

With reference to FIG. 22, a transmission controller 320 is provided for operating the clutch actuators 26, 28 and the shift actuators 218, 219. The transmission controller 320 provides signals to the driver motors 134 of the clutch actuators 26, 28 as well as to the driver motors 234 of the shift actuators 218, 219. The transmission controller 320 also monitors the position of the clutch actuators 26, 28 as well as the shift actuators 218, 219 via potentiometers 164, 246, respectively. Uninterrupted power shifting between gears is accomplished by engaging the desired gear prior to a shift event. The transmission 10 of the present invention can be in two different gear ratios at once, preferably with only one clutch 20, 22 being engaged for transmitting power during normal operation; however, as discussed below, both clutches may be at least partially engaged during vehicle launch or during the shift change operations. In order to shift to a new gear ratio, the current driving clutch will be released via the corresponding clutch actuator and the released clutch will be engaged via the corresponding clutch actuator. The two clutch actuators perform a quick and smooth shift as directed by the transmission controller 320 which monitors the speed of the input shafts 14 and 16 via speed in sensors 322 and 324, respectively, as well as the speed of the driven shaft 18 via a speed sensor 326. Alternatively, the controller 320 can determine the speed of the input shafts 14 and 16 based upon the known gear ratio and the speed of the driven shaft 18 as detected by sensor 326. An engine speed sensor 327 is also provided and detects the speed of the flywheel 96. Based upon the accelerator pedal position as detected by sensor 328, the vehicle speed, and the current gear ratio, the transmission controller 320 anticipates the next gear ratio of the next shift and drives the shift actuators 218, 219, accordingly, in order to engage the next gear ratio while the corresponding clutch actuator is in the disengaged position. As a gear is engaged, the corresponding input shaft which is disengaged from the engine output shaft, becomes synchronized with the rotational speed of the driven shaft 18. At this time, the clutch which is associated with the current driving input shaft is disengaged and the other clutch is engaged in order to drive the input shaft associated with the selected gear.

With reference to FIGS. 22-26, the preferred method for controlling a dual clutch transmission during vehicle launch 410 according to the principles of the present invention, will now be described. As shown particularly in FIG. 23, the method 410 for controlling a dual clutch transmission during vehicle launch generally includes the following steps: determining 412 the predetermined first clutch slip value 413 based on the perceived vehicle loading; initiating 414 launch of the motor vehicle with both the first and the second clutches partially engaged; determining 416 the vehicle inertia value 417 based on the summation of instantaneous vehicle inertia values during vehicle launch; and controlling 418 either the first or the second clutch to disengage when the predetermined first clutch slip value 413 is reached.

In order to execute the step of determining 412 the predetermined first clutch slip value 413, the perceived vehicle loading is preferably evaluated first. The perceived vehicle loading is preferably determined as a function of the overall mass of the vehicle and the occupants therein, although it may additionally be based on the perceived slope of the ground. One skilled in the art will recognize that overall vehicle and occupants' mass may be determined in a variety of ways, such as through the use of load sensors placed throughout the vehicle. Likewise, one skilled in the art will also recognize that slope of the ground relative to the vehicle may be evaluated in a number ways, such as through the use of level indicators, gyros, and the like. In operation, during this step the transmission controller 320 receives inputs from load sensors, level indicators, and the like, and based on those inputs evaluates the perceived vehicle loading. Based on the perceived vehicle loading, the transmission controller 320 executes this step and determines 412 the predetermined first clutch slip value 413. Although the transmission controller performs this step 412, one skilled in the art recognizes that an onboard computer or other controller may also evaluate perceived vehicle loading and thereby determine the first clutch slip value.

The step of initiating 414 launch of the motor vehicle using both clutches is possible because the electromechanical automatic transmission 10 can simultaneously engage two different gear ratios at once, and in particular, can simultaneously engage the first speed driven gear 78 and the second speed driven gear 80 for purposes of vehicle launch. During this step, the first speed driven gear 78 is drivingly engaged by the engine output shaft via the first clutch 20 and the first input shaft 14, and the second speed driven gear 80 is drivingly engaged by the engine output shaft via the second clutch 22 and the second input shaft 16. To accomplish this, the transmission controller 320 directs both of the driver motors 234 of the shift actuators 218, 219 to engage the first speed gear 32 and the second speed gear 42, and the clutch actuators 26,28 to engage both the first clutch 20 and the second clutch 22. In order to engage the driven shaft 18 with two different gear ratios during vehicle launch, one or both of the clutches 20,22 must be able to slip. In this case both clutches are able to slip prior to full engagement of either of the clutches 20,22; however, one of the clutches 20,22 could be fully engaged while the other clutch is able to slip.

The use of two drive gears to launch a vehicle provides many advantages. For example, two clutches rather than one are able to absorb the large amount of stress associated with the launch of a vehicle, particularly when the vehicle is carrying or pulling a heavy load. Because of the large amount of stress placed on a clutch during vehicle launch, and because clutches typically operate on friction principles, a large amount of heat is generated in a clutch during vehicle launch. By initiating launch using two clutches, the heat is dissipated through both clutches, which prolongs the useful life of both of them. Additionally, because around half of clutch wear is typically associated with vehicle launch, the use of two clutches during vehicle launch with extend clutch life and thereby reduce the maintenance associated with replacing clutches due to wear. In the present invention, the first clutch 20 and the second clutch 22 are preferably designed to have equivalent useful so that both may be replaced at the same time.

The step of determining 416 the vehicle inertia value preferably occurs during vehicle launch, although it could be based on a determination made before vehicle launch. The vehicle inertia value is preferably determined based on a summation of the instantaneous vehicle inertia values determined during vehicle launch, and each of the instantaneous vehicle inertia values are preferably based on a comparison of an instantaneous engine speed and the corresponding instantaneous vehicle speed. The speed of the engine is monitored by the engine speed sensor 327. Each instantaneous engine speed reading is simply the engine speed measured at a particular instant by the engine speed sensor 327. The vehicle speed can be measured in a number of ways known in the art. For example, it can be measured according to the conventional methods used for mechanical speedometers, quartz electric speedometers, or digital microprocessor speedometers. In this embodiment, it is preferably determined based on measurements from the driven shaft speed sensor 326, wherein the instantaneous vehicle speed is simply a function of the driven shaft speed as measured by speed sensor 326 at a particular instant. Each of the instantaneous vehicle inertia values are preferably determined by the transmission controller 320 based on a comparison during vehicle launch of the instantaneous engine speed measured by the engine speed sensor 327 and the corresponding instantaneous vehicle speed based on the speed of the driven shaft 18 measured by speed sensor 326.

In operation, to accomplish the step of determining 416 the vehicle inertia value 416, the transmission controller 320 continuously evaluates instantaneous vehicle inertia values during the launch period. Based on a summation of these values, the transmission controller 320 continually re-determines the overall vehicle inertia value 417 throughout the launch process, at least until the predetermined first clutch slip value is substantially reached. Although this step is preferably performed by the transmission based on measurements from the engine speed sensor 327 and the driven shaft speed sensor 326, it may alternatively be performed by another onboard computer.

The step of controlling one of the clutches to disengage 418 is also preferably performed primarily by the transmission controller. In this step, the transmission controller 320 controls one of the clutches 20,22 to disengage as the predetermined first clutch slip value 413 is substantially reached. In order to determine when the predetermined first clutch slip value 413 is reached, the controller 320 monitors the amount of clutch slip during vehicle launch. Clutch slip may be monitored and determined in various ways known in the art. In this embodiment, the amount of clutch slip for each clutch is determined by evaluating the engine speed measured by the engine speed sensor 327 and the speed of the corresponding input shaft 14,16 measured by speed sensors 322, 324 respectively. Alternatively, the position of the clutch actuators 26,28 may be monitored and the amount of clutch slip determined therefrom; however, because the amount of clutch slip varies relative to the vehicle load and the slope of the road, it is preferable for the amount of clutch slip to be directly measured. Although the transmission controller 320 may monitor the slip of both clutches, the step of controlling 418 one of the clutches to disengage is preferably based on a comparison of the first clutch slip value to the predetermined first clutch slip value 413. When the predetermined first clutch slip value 413 is substantially reached, the transmission controller 320 makes a decision as to which clutch should be disengaged and whether the vehicle should continue to launch in either first speed gear 32 or second speed gear 42. This decision is preferably based on the vehicle inertia value.

In order to decide which clutch to disengage, the transmission controller 320 evaluates, based on the vehicle inertia value 417, whether the vehicle needs maximum power, in which case the controller directs the second clutch 22 to disengage and the vehicle continues launching in the first speed gear 32, or whether it is appropriate to preserve fuel economy, in which case the controller directs the first clutch 20 to disengage and the vehicle continues launching in the second speed gear 42. Once the transmission controller 320 decides which clutch to disengage, it directs the appropriate clutch actuator 26,28 that corresponds with the gear to be dropped to disengage, and the vehicle continues to launch in the remaining gear.

In most cases, particularly when hauling a light to moderate load, the first speed gear 32 will be dropped and the vehicle will continue to launch in the second speed gear 42. The result in these situations is that the gear shift between first and second gear is eliminated. Because this gear shift typically produces the largest jolt associated with gear shifts, this method has the added benefit of completely eliminating this shift and thereby greatly improving the smoothness of vehicle launches.

Figure 24:
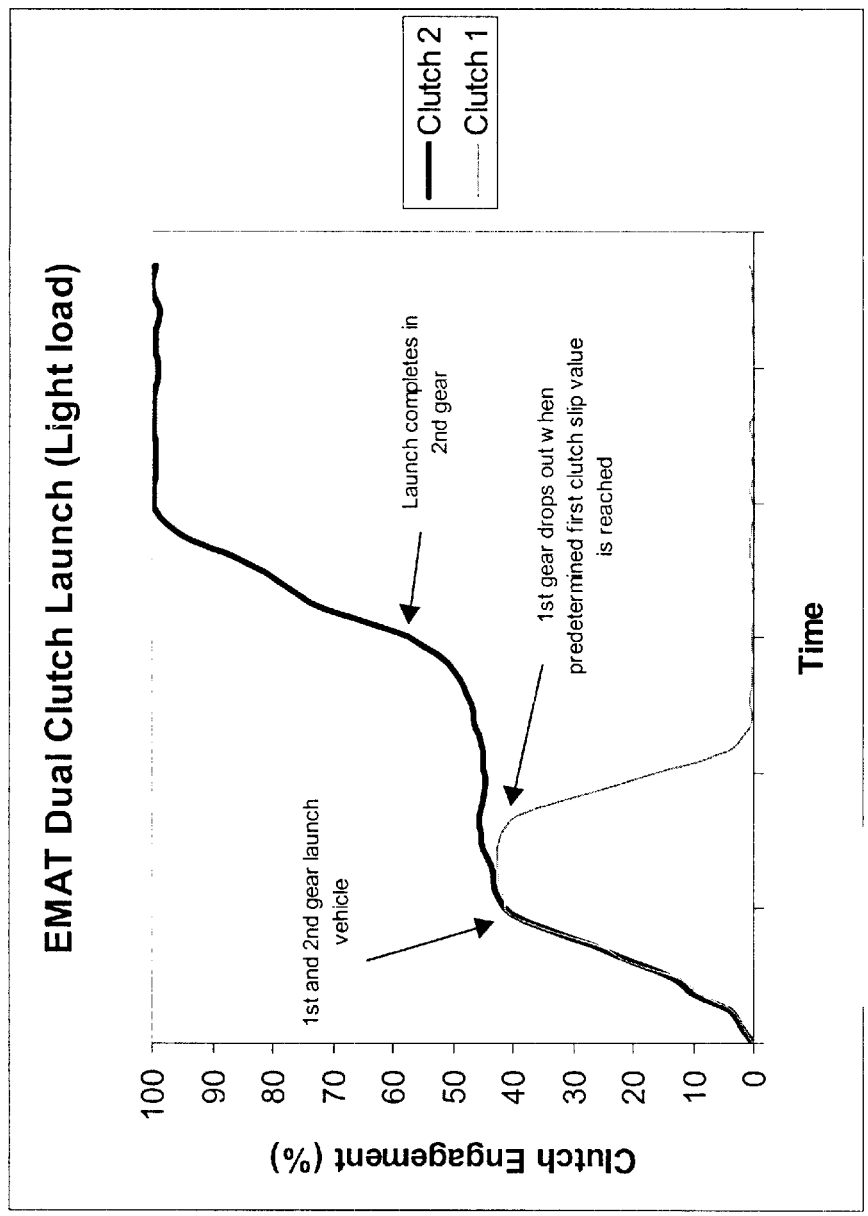
FIG. 24 is a graph showing the percent engagement of the first and the second clutch versus time during vehicle launch for a light load when the exemplary electromechanical automatic transmission of FIGS. 1–22 is controlled in accordance with the method illustrated in FIG. 23.
Figure 25:
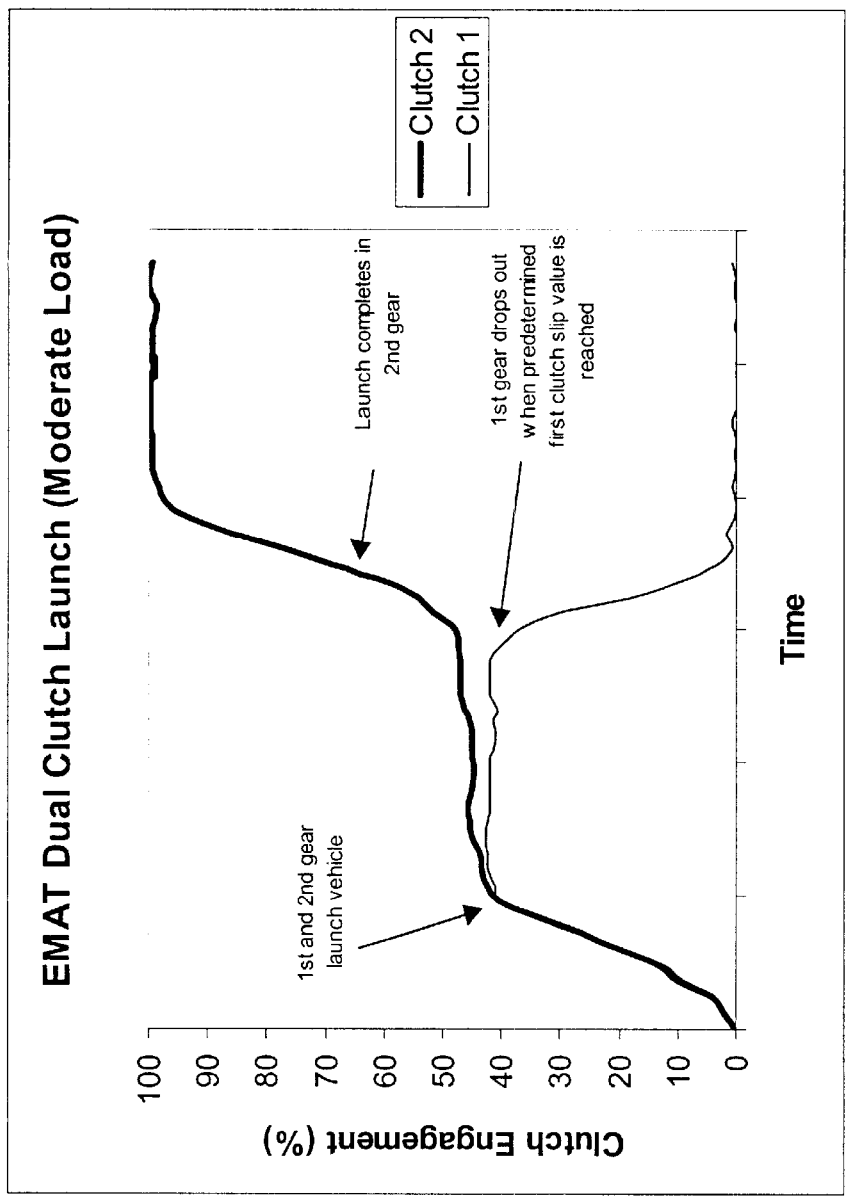
FIG. 25 is a graph showing the percent engagement of the first and the second clutch versus time during vehicle launch for a moderate load when the exemplary electromechanical automatic transmission of FIGS. 1–22 is controlled in accordance with the method illustrated in FIG. 23.
Figure 26:
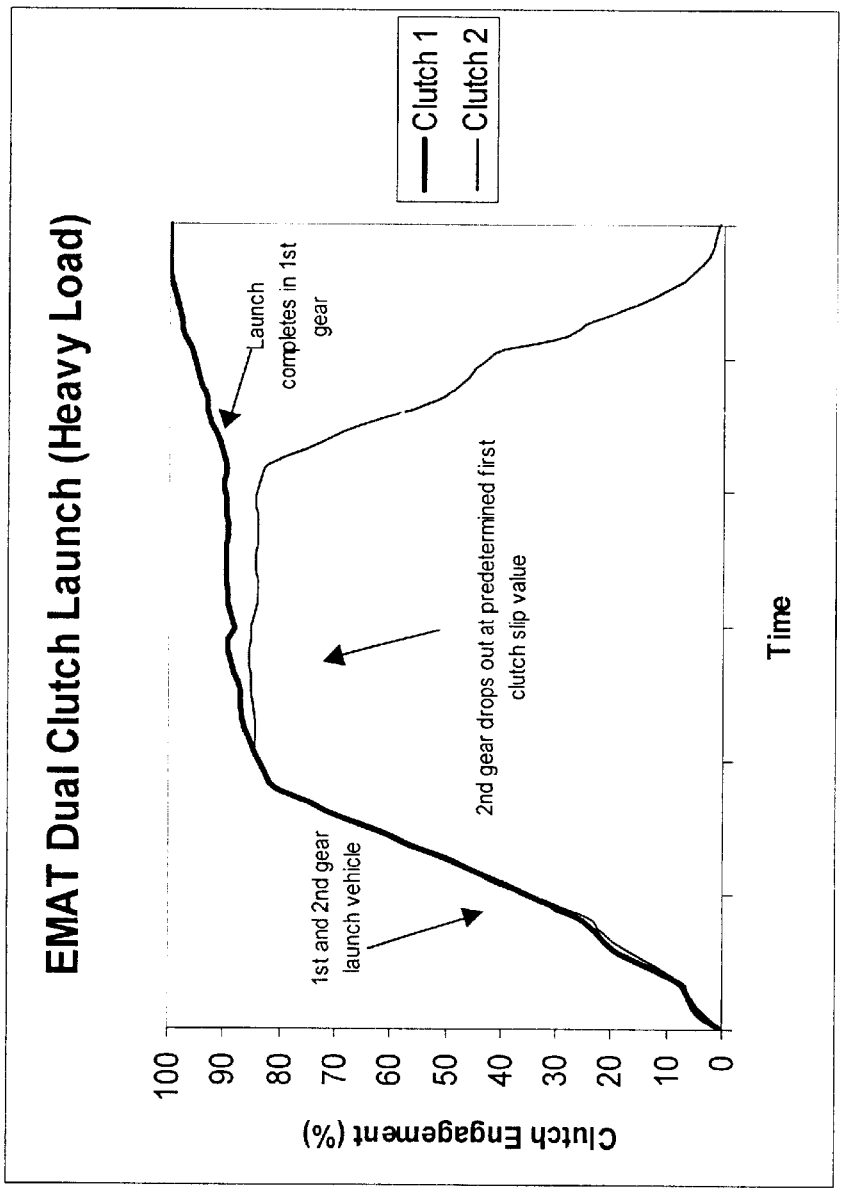
FIG. 26 is a graph showing the percent engagement of the first and the second clutch versus time during vehicle launch for a heavy load when the exemplary electromechanical automatic transmission of FIGS. 1–22 is controlled in accordance with the method illustrated in FIG. 23.

Referring now to FIGS. 24–26, the launch of a vehicle in accordance with the present invention is graphically represented. FIG. 24 illustrates the launch of a motor vehicle with a light load. In accordance with the step of initiating 414 launch of the motor vehicle using both clutches, both clutch actuators 26,28 are directed to engage both clutches 20,22 at relatively equal rates. In the situation where the vehicle is lightly loaded, the first clutch slip value approaches zero relatively quickly and long before the clutch is fully engaged. In this situation, the predetermined first clutch slip value 413 is set fairly high, such as about 20%. As shown, with a light load, the controller 320 typically decides to disengage the first clutch with the first speed gear, and the vehicle continues to launch in the second speed gear 80. Because the load is light, the first clutch 20 can be fairly quickly disengaged without affecting the smooth vehicle launch.

FIG. 25 illustrates the launch of a motor vehicle with a moderate load. In accordance with the step of initiating 414 launch of the motor vehicle using both clutches, both clutch actuators 26,28 are also directed to engage both clutches 20,22 at relatively equal rates in this situation. When the vehicle is moderately loaded, the first clutch slip value also approaches zero long before the clutch is fully engaged. In this situation, the predetermined first clutch slip value 413 is also set to a fairly high value, such as 15%. As shown, with a moderate load, the controller 320 also typically decides to disengage the first clutch with the first speed gear, and the vehicle continues to launch in the second speed gear 80. Because the load is moderate rather than light, the first clutch 20 is disengaged at a slower rate to ensure that it does not affect the smooth vehicle launch.

FIG. 26 illustrates the launch of a motor vehicle with a heavy load. In accordance with the step of initiating 414 launch of the motor vehicle using both clutches, both clutch actuators 26,28 are also directed to engage both clutches 20,22 at relatively equal rates in this situation. When the vehicle is heavily loaded, however, the first clutch slip value approaches zero much closer to full clutch engagement. In this situation, the predetermined first clutch slip value 413 is set to a fairly low value, such as 5%. As shown, with a heavy load, the controller 320 typically decides to disengage the second clutch with the second speed gear, and the vehicle continues to launch in the first speed gear 78. Because the load is heavy rather than light, the second clutch 22 is disengaged at a slow rate to ensure that it does not affect the smooth vehicle launch. If and when the vehicle reaches a point a which it is appropriate to shift to the second speed gear 80, then the transmission controller 320 will control the gear shift as with other gear shifts.

Figure 27:
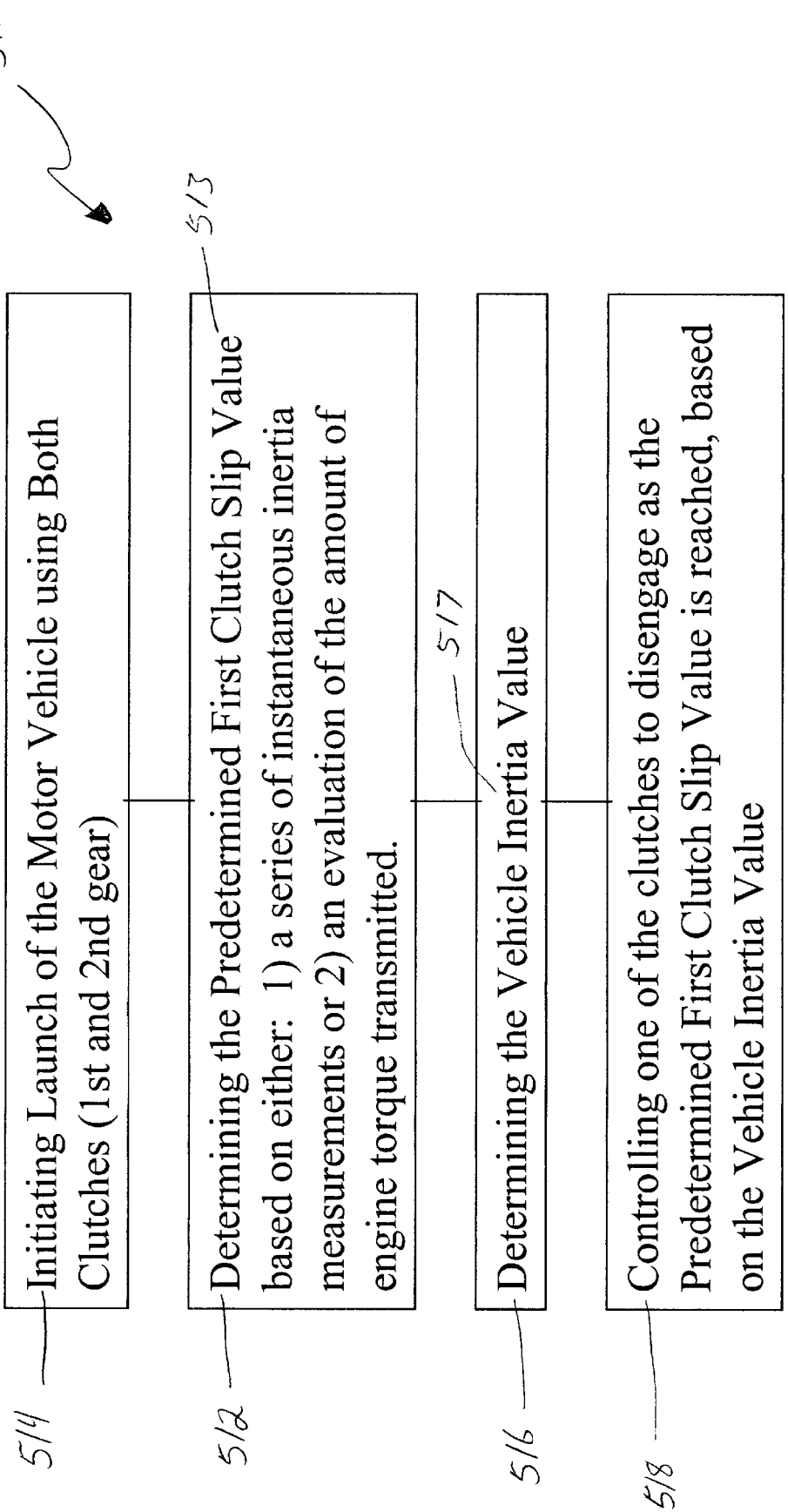
FIG. 27 is a flow diagram illustrating the steps of the method of the present invention in accordance with a second embodiment.

With particular reference to FIG. 27, a method for controlling a dual clutch transmission during vehicle launch 410 in accordance with the second preferred embodiment will now be described. The second preferred embodiment differs from the first preferred embodiment in that the step of determining the predetermined first clutch slip value occurs after vehicle launch is initiated. Except for preferences and aspects related to this difference, all other preferences and aspects are the same as the first preferred embodiment.

As shown in FIG. 27, the method 510 for controlling a dual clutch transmission during vehicle launch generally includes the following steps: initiating 514 launch of the motor vehicle with both the first and the second clutches partially engaged; determining 512 the predetermined first clutch slip value 513, determining 516 the vehicle inertia value; and controlling 518 either the first or the second clutch to disengage when the predetermined first clutch slip value 513 is reached. The step of determining 512 the predetermined first clutch slip value differs from the first preferred embodiment in that it occurs after vehicle launch is initiated, and that it is based on either a series of instantaneous inertia measurements, or an evaluation of the amount of engine torque transmitted. Whether the predetermined first clutch slip value is based on inertia measurements or an evaluation of engine torque transmitted, it is still based on the perceived vehicle load, because both options provide a way to perceive the vehicle load.

In the first case, the transmission controller 320 bases its determination of the predetermined first clutch slip value 513 on the first values in the series of instantaneous vehicle inertia values. These values are determined as discussed in the step of determining 416 the vehicle inertia value discussed in the first preferred embodiment. In this case, the first vehicle inertia values enable the transmission controller 320 to perceive the load on the vehicle.

In the second case, the transmission controller 320 may base its decision on a comparison of the engine speed measured by the engine sensor 327 and the speed of the driven shaft 18, as well as the amount of slip in the clutches 20,22. This second case enables the transmission controller 320 to evaluate the perceived vehicle load by considering the amount of engine torque transmitted to the driven shaft 18.

In either case, immediately after launch of the motor vehicle is initiated, the predetermined first clutch slip value 513 is determined by the transmission controller 320 based on the perceived vehicle loading. This is because the load on the vehicle will directly affect the inertia of the vehicle during launch, and will additionally be represented by the amount of engine torque required to start moving the vehicle at a given speed. The second preferred embodiment has the added benefits of not requiring load sensors or level indicators to determine the perceived vehicle load, and other factors, such as high rolling resistance because of low tire pressure, a rough road surface, or other reasons, are automatically built into the process.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best modes presently contemplated for carrying out this invention, but that the invention will include any embodiments falling within the description of the appended claims.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method of controlling a transmission for a motor vehicle, the transmission having a dual clutch system, the transmission including:

a first transmission input shaft including a plurality of drive gears mounted thereon;

a second transmission input shaft including a plurality of drive gears mounted thereon, the first and second transmission input shafts being concentric with one another;

a driven shaft having a plurality of gears mounted thereon in meshing engagement with the plurality of drive gears on the first and second transmission input shafts;

a first flywheel adapted to be mounted to an output shaft of an engine;

a first friction disk assembly mounted to the first transmission input shaft;

a first pressure plate adapted to be frictionally engaged with the first friction disk assembly and including a first linkage assembly for disengaging the first pressure plate from frictional engagement with the first friction disk assembly;

a second flywheel mounted to the first flywheel for rotation therewith;

a second friction disk assembly mounted to the second transmission input shaft;

a second pressure plate adapted to be frictionally engaged with the second friction disk, and assembly and including a second linkage assembly for disengaging the second pressure plate from frictional engagement with the second friction disk assembly;

the method comprising the steps of:

initiating a launch of the motor vehicle with the first pressure plate less than fully frictionally engaging the first friction disk assembly, and the second pressure plate less than fully frictionally engaging the second friction disk assembly; and controlling one of the first linkage assembly and the second linkage assembly to disengage the corresponding one of the first pressure plate and the second pressure plate from frictional engagement with the corresponding one of the first friction disk assembly and the second friction disk assembly at a predetermined first clutch slip value based on a vehicle inertia value;

wherein the predetermined first clutch slip value is variable.

2. The method of controlling a transmission according to claim 1, further comprising the step of determining the predetermined first clutch slip value.

3. The method of controlling a transmission according to claim 1, wherein the predetermined first clutch slip value is a function of a perceived vehicle loading value.

4. The method of controlling a transmission according to claim 3, wherein the perceived vehicle loading value is a function of the mass of the vehicle, the mass of cargo carried by the vehicle, the mass of passengers, the mass of cargo towed by the vehicle, and the slope of the ground upon which the vehicle is driven.

5. The method of controlling a transmission according to claim 3, wherein the perceived vehicle loading value is determined by comparing the total torque generated by the engine with the speed of the vehicle during vehicle launch.

6. The method of controlling a transmission according to claim 1, wherein the first clutch slip value is determined as a function of the speed of one of the first flywheel and the second flywheel, and the speed of the first input shaft.

7. The method of controlling a transmission according to claim 1, wherein the first and second linkage assemblies are respectively driven by a first and a second electromechanical clutch actuator, and wherein the first clutch slip value is determined as a function of the position of the first electromechanical clutch actuator.

8. The method of controlling a transmission according to claim 1, wherein the vehicle inertia value is a function of a plurality of instantaneous vehicle inertia values determined during vehicle launch.

9. The method of controlling a transmission according to claim 8, wherein each instantaneous vehicle inertia value is a function of the corresponding instantaneous engine speed and the corresponding instantaneous vehicle speed.

10. The method of controlling a transmission according to claim 1, further comprising the step of determining the vehicle inertia value during vehicle launch.

11. The method of controlling a transmission according to claim 10, wherein the step of determining the vehicle inertia value comprises:

repeatedly determining the difference between an instantaneous engine speed and the corresponding instantaneous vehicle speed until the predetermined first clutch slip value is reached; and calculating the vehicle inertia value as a function of the continuous summation of the instantaneous speed differences.

12. The method of controlling a transmission according to claim 1, wherein the first and the second friction disks each have an equivalent service life.

13. A method of controlling a transmission of a motor vehicle, the motor vehicle having an engine having an engine flywheel, the transmission including a first clutch assembly for transferring torque from the engine flywheel to a first driven gear, and a second clutch assembly for transferring torque from the flywheel to a second driven gear, the method comprising the steps of:

initiating a launch of the motor vehicle with the first clutch assembly less than fully coupling the flywheel to the first driven gear and the second clutch assembly less than fully coupling the flywheel to the second driven gear; and controlling one of the first clutch assembly and the second clutch assembly to decouple the flywheel and one of the first driven gear and the second driven gear at a predetermined first clutch slip value based on an instantaneous vehicle inertia value;

wherein the predetermined first clutch slip value is variable.

14. The method of controlling a transmission according to claim 13, further comprising the step of determining the predetermined first clutch slip value.

15. The method of controlling a transmission according to claim 13, wherein the predetermined first clutch slip value is a function of a perceived vehicle loading value.

16. The method of controlling a transmission according to claim 15, wherein the perceived vehicle loading value is a function of the mass of the vehicle, the mass of cargo carried by the vehicle, the mass of passengers, the mass of cargo towed by the vehicle, and the slope of the ground upon which the vehicle is driven.

17. The method of controlling a transmission according to claim 15, wherein the perceived vehicle loading value is determined by comparing the total torque generated by the engine with the speed of the vehicle during vehicle launch.

18. The method of controlling a transmission according to claim 13, wherein the predetermined first clutch slip value is determined as a function of the speed of the flywheel and the speed of the first driven gear shaft.

19. The method of controlling a transmission according to claim 13, wherein the first and second clutch assemblies are respectively driven by a first and a second electromechanical clutch actuator, and wherein the first clutch slip value is determined as a function of the position of the first electromechanical clutch actuator.

20. The method of controlling a transmission according to claim 13, wherein the vehicle inertia value is a function of a plurality of instantaneous vehicle inertia values determined during vehicle launch.

21. The method of controlling a transmission according to claim 20, wherein each instantaneous vehicle inertia value is a function of the corresponding instantaneous engine speed and the corresponding instantaneous vehicle speed.

22. The method of controlling a transmission according to claim 13, further comprising the step of determining the vehicle inertia value during vehicle launch.

23. The method of controlling a transmission according to claim 22, wherein the step of determining the vehicle inertia value comprises:

repeatedly determining the difference between an instantaneous engine speed and the corresponding instantaneous vehicle speed until the predetermined first clutch slip value is reached; and calculating the vehicle inertia value as a function of the continuous summation of the instantaneous speed differences.

24. The method of controlling a transmission according to claim 13, wherein the first and the second clutch assemblies each have an equivalent service life.

\* \* \* \* \*